US010110109B2

(12) United States Patent
Farquharson

(10) Patent No.: US 10,110,109 B2
(45) Date of Patent: Oct. 23, 2018

(54) SELF-POWERED ALTERNATIVE ENERGY MACHINE TO GENERATE ELECTRICITY

(71) Applicant: Aston Gustavous Farquharson, Stormville, NY (US)

(72) Inventor: Aston Gustavous Farquharson, Stormville, NY (US)

( * ) Notice: Subject to any disclaimer, the term of this patent is extended or adjusted under 35 U.S.C. 154(b) by 330 days.

(21) Appl. No.: 14/935,981

(22) Filed: Nov. 9, 2015

(65) Prior Publication Data
US 2016/0072373 A1 Mar. 10, 2016

Related U.S. Application Data

(63) Continuation-in-part of application No. 14/737,001, filed on Jun. 11, 2015, now Pat. No. 9,692,275.

(60) Provisional application No. 62/076,847, filed on Nov. 7, 2014, provisional application No. 62/134,092, filed on Mar. 17, 2015, provisional application No. 62/010,698, filed on Jun. 11, 2014.

(51) Int. Cl.
*H02K 7/06* (2006.01)
*H02K 53/00* (2006.01)
*H02K 7/116* (2006.01)

(52) U.S. Cl.
CPC ............. *H02K 53/00* (2013.01); *H02K 7/116* (2013.01); *Y10S 74/09* (2013.01)

(58) Field of Classification Search
CPC ........ H02K 7/116; H02K 16/02; H02K 51/00; H02K 49/102; H02K 7/003
USPC .............................. 310/83, 47, 114, 50, 75 R
See application file for complete search history.

(56) References Cited

U.S. PATENT DOCUMENTS 1,723,857 A * 8/1929 Hobart .................... H02P 27/04
  318/148
4,343,239 A * 8/1982 Seifert ....................... B41J 9/38
  101/93.34
4,353,003 A 10/1982 Sommers
(Continued)

FOREIGN PATENT DOCUMENTS

AU  1868883 A  11/1984
DE  10151067 A1  4/2003
(Continued)

OTHER PUBLICATIONS

U.S. Appl. No. 14/737,001, Notice of Allowance & Fees Due, dated Feb. 28, 2017, 19 pgs.
(Continued)

*Primary Examiner* — Thanh Lam
(74) *Attorney, Agent, or Firm* — Madeline F. Schiesser; Keohane & D'Alessandro PLLC

(57) ABSTRACT

An alternative energy generating apparatus is provided. The apparatus comprises a stationary metal coil or coils positioned by, above, below, or beside a magnet or a rotor of magnets with one or more imbedded magnets (e.g., rare earth magnets). Magnets may be imbedded along an outer part of a disc-like rotor. The one or more coils may be held in a coil plate apparatus, essentially parallel to the magnet rotor. The provided apparatus further comprises a shaft having a gear ratio for turning the rotor of magnets, such as by hand or by a motor in order to achieve a high turning velocity. The magnets generate an electromagnetic field, which when rotated against the stationary metal coils, produce an electric current.

20 Claims, 12 Drawing Sheets

(56) References Cited

U.S. PATENT DOCUMENTS

| | | | |
|---|---|---|---|
| 4,397,150 A | 8/1983 | Paller | |
| 4,410,805 A | 10/1983 | Berley | |
| 4,798,986 A * | 1/1989 | Smith, Jr. | H02K 21/24 |
| | | | 310/184 |
| 5,089,734 A | 2/1992 | Bickraj | |
| 6,249,058 B1 | 6/2001 | Rea | |
| 6,756,719 B1 | 6/2004 | Chiu | |
| 6,914,340 B2 | 7/2005 | Becker et al. | |
| 7,190,088 B2 * | 3/2007 | Heidel | F03B 13/00 |
| | | | 290/43 |
| 7,723,880 B2 | 5/2010 | Dai | |
| 7,902,708 B2 | 3/2011 | Elmaleh | |
| 8,717,098 B2 * | 5/2014 | Cawley | H03F 3/211 |
| | | | 330/59 |
| 8,791,615 B2 | 7/2014 | Chang | |
| 9,692,275 B2 | 6/2017 | Farquharson | |
| 2003/0080711 A1 | 5/2003 | Stearns | |
| 2005/0173996 A1 * | 8/2005 | Ellison | H02K 53/00 |
| | | | 310/40 R |
| 2006/0000215 A1 | 1/2006 | Kremen et al. | |
| 2006/0076781 A1 | 4/2006 | McQueen | |
| 2007/0040385 A1 | 2/2007 | Uchiyama | |
| 2009/0095125 A1 * | 4/2009 | Ekchian | H02K 7/1861 |
| | | | 74/572.11 |
| 2010/0102570 A1 | 4/2010 | Boyd-Wilson et al. | |
| 2010/0213723 A1 | 8/2010 | Kazadi | |
| 2010/0301608 A1 | 12/2010 | Rush | |
| 2011/0084494 A1 | 4/2011 | Andujar | |
| 2011/0084495 A1 | 4/2011 | Wu et al. | |
| 2012/0091843 A1 * | 4/2012 | Gore | H02K 53/00 |
| | | | 310/113 |
| 2012/0204564 A1 | 8/2012 | Battaglia | |
| 2013/0009404 A1 | 1/2013 | Trachsell | |
| 2014/0159374 A1 | 6/2014 | Farquharson et al. | |
| 2014/0159377 A1 | 6/2014 | Farquharson et al. | |
| 2015/0364971 A1 | 12/2015 | Farquharson et al. | |

FOREIGN PATENT DOCUMENTS

| | | |
|---|---|---|
| KR | 20120094205 A | 8/2012 |
| WO | 2010112685 A4 | 10/2010 |
| WO | 2010135484 A2 | 11/2010 |
| WO | 2011044144 A1 | 4/2011 |
| WO | 2014051676 A1 | 4/2014 |

OTHER PUBLICATIONS

Lee W. Young, PCT Notification of Transmittal of the International Search Report and the Written Opinion of the International Searching Authority, or the Declaration, dated Sep. 30, 2014, 9 pages.

Thomas, Shane, PCT/US15/59703, PCT Search Report & Written Opinion, dated Feb. 9, 2016, 15 pages.

Tarak, Jabri, "Extended European Search Report", Application No. EP 15862183.9, dated Apr. 26, 2018, 11 pages.

* cited by examiner

SELF-POWERED ALTERNATIVE ENERGY MACHINE TO GENERATE ELECTRICITY

RELATED U.S. APPLICATION DATA

The present patent document claims priority to U.S. provisional patent application Ser. No. 62/076,847, filed Nov. 7, 2014 and entitled "SELF-POWERED ALTERNATIVE ENERGY MACHINE TO GENERATE ELECTRICITY" and to U.S. provisional patent application Ser. No. 62/134,092, filed Mar. 17, 2015 and entitled "SELF-POWERED ALTERNATIVE ENERGY MACHINE TO GENERATE ELECTRICITY", the disclosures of which are incorporated herein by reference. The present patent document is also a continuation-in-part of U.S. patent application Ser. No. 14/737,001, filed Jun. 11, 2015 and entitled "ALTERNATIVE ENERGY GENERATOR", which claims priority to U.S. provisional patent application Ser. No. 62/010,698, filed Jun. 11, 2014 and entitled "ALTERNATIVE ENERGY GENERATOR", the disclosures of which are incorporated herein by reference.

FIELD OF THE INVENTION

The present invention relates generally to a method and apparatus for generating large amounts of electricity using a self-powered alternative energy machine, and more specifically to a mechanical apparatus machine having metal coils and a rotating set of magnets that can be propelled by turning a shaft having a gear ratio by hand or by a motor to generate a rotating spin velocity to create an electromagnetic field for the generation of electricity.

BACKGROUND

Energy may be generated from wind and solar energy sources as well as sources of fossils fuel and chemicals. Alternative forms of generating electricity are important for many reasons, such as lowering costs to the public. In general, windmills, used to capture wind energy, and solar panels, used to capture solar light energy, continue to prove costly due to, for example, complex manufacturing methods and weight of materials. Solar panels also, in general, provide a cost-ineffective source of energy, requiring large spaces for installation. Using chemicals as an energy source is potentially dangerous and hazardous to the environment. As such, there is a need for a safe, cost-effective method and apparatus that may be configured to generate electricity continuously at a reasonable price for the public use, residentially, commercially and to power motors in general and motor vehicles. Alternatively and more particularly, there is a need to use an alternative source of energy that is a cost-effective method and apparatus that also generates electricity continuously (e.g., seven days per week by twenty-four hours daily (hereinafter 24×7)). Wind, sun, and other grid sources of energy are not available 24×7 because they depend on specific weather conditions. There is also a need for alternative sources of energy to alleviate or eliminate global warming. Accordingly, alternative sources of energy that have a minimal to zero carbon footprint are desirable as a sustainable energy source.

SUMMARY

An apparatus comprising a stationary metal coil or coils positioned by, above, below, or beside a magnet or a rotor of magnets with one or more imbedded magnets, similar to an inner arrangement of a Shurite amp meter is provided. Magnets may be imbedded along an outer part of a disc-like rotor, like the numbers on a clock, and may be numerous and close or few and far apart from each other. Also the one or more coils are held in a coils plate, essentially parallel to the magnet rotor. The coils may be placed on an outer part of the plate apparatus and may also be placed closer or further apart like the numbers on a clock. The provided apparatus further comprises a shaft having a gear ratio for turning the rotor of magnets, such as by hand or by a motor in order to achieve a high turning velocity. The magnets generate an electromagnetic field, which when rotated against the stationary metal coils, produce an electric current.

A first aspect of the present invention includes an electrical generator device, comprising: a rotating apparatus, the rotating apparatus having an axis of rotation and a mass; at least one metal coil disposed on the rotating apparatus; at least one stationary magnet, a magnetic flux field of the magnet being in contact with the metal coil; a shaft secured to the rotating apparatus along the axis of rotation; a mechanical movement delivery apparatus in mechanical contact with the shaft; and a set of gears having a gear ratio of more than one in mechanical contact with the rotating apparatus and the mechanical movement delivery apparatus via the shaft, wherein energy is generated when the metal coil passes through the magnetic flux field of the magnet.

A second aspect of the present invention includes An electricity generator, comprising: a rotating apparatus, the rotating apparatus having an axis of rotation; at least one magnet disposed on the rotating apparatus; at least one stationary metal coil, a magnetic flux field of the magnet being in contact with the metal coil; a shaft secured to the rotating apparatus along the axis of rotation; a mechanical movement delivery apparatus in mechanical contact with the shaft; and a set of gears having a gear ratio of more than one in mechanical contact with the rotating apparatus and the mechanical movement delivery apparatus via the shaft, wherein energy is generated when the magnetic flux field of the magnet passes through the metal coil.

A third aspect of the present invention, includes a method of operating an electrical generator, comprising: powering a motor, in mechanical contact with a rotatable apparatus embedded with one of metal coils or magnets, with an outside source; rotating the rotatable apparatus at at least 5 revolutions per minute (RPM); passing a metal coil through a magnetic field through via the rotating motion of the rotatable apparatus; generating an electrical current based on the passing of the metal coil through the magnetic field; disconnecting the outside source; and powering the motor with the generated electrical current.

BRIEF DESCRIPTION OF THE DRAWINGS

These and other features of this invention will be more readily understood from the following detailed description of the various aspects of the invention taken in conjunction with the accompanying drawings in which.

and one mounted view of one magnets rotor arrangement (right), according to an embodiment of the present invention.

Figure 4:
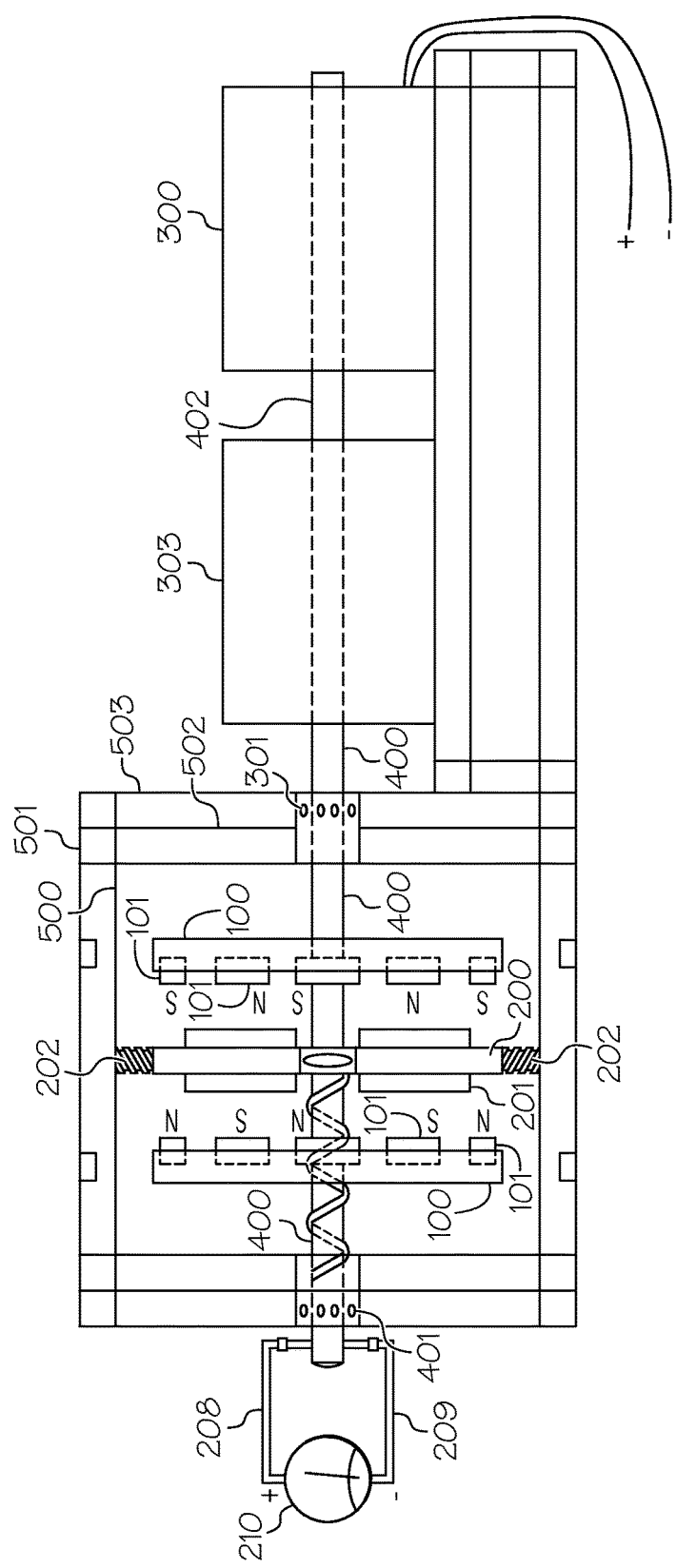

FIG. 4 is a front interior view of another embodiment of the present invention utilizing a coils plate mounted on coil frame apparatus in the center of two magnets rotors on either side of the coils plate, wherein the coils plate is sandwiched with magnets rotor very closely to the coils with neither magnets rotor not coils plate touching or brushing one another, and forming a centrifuge-like arrangement.

Figure 1:
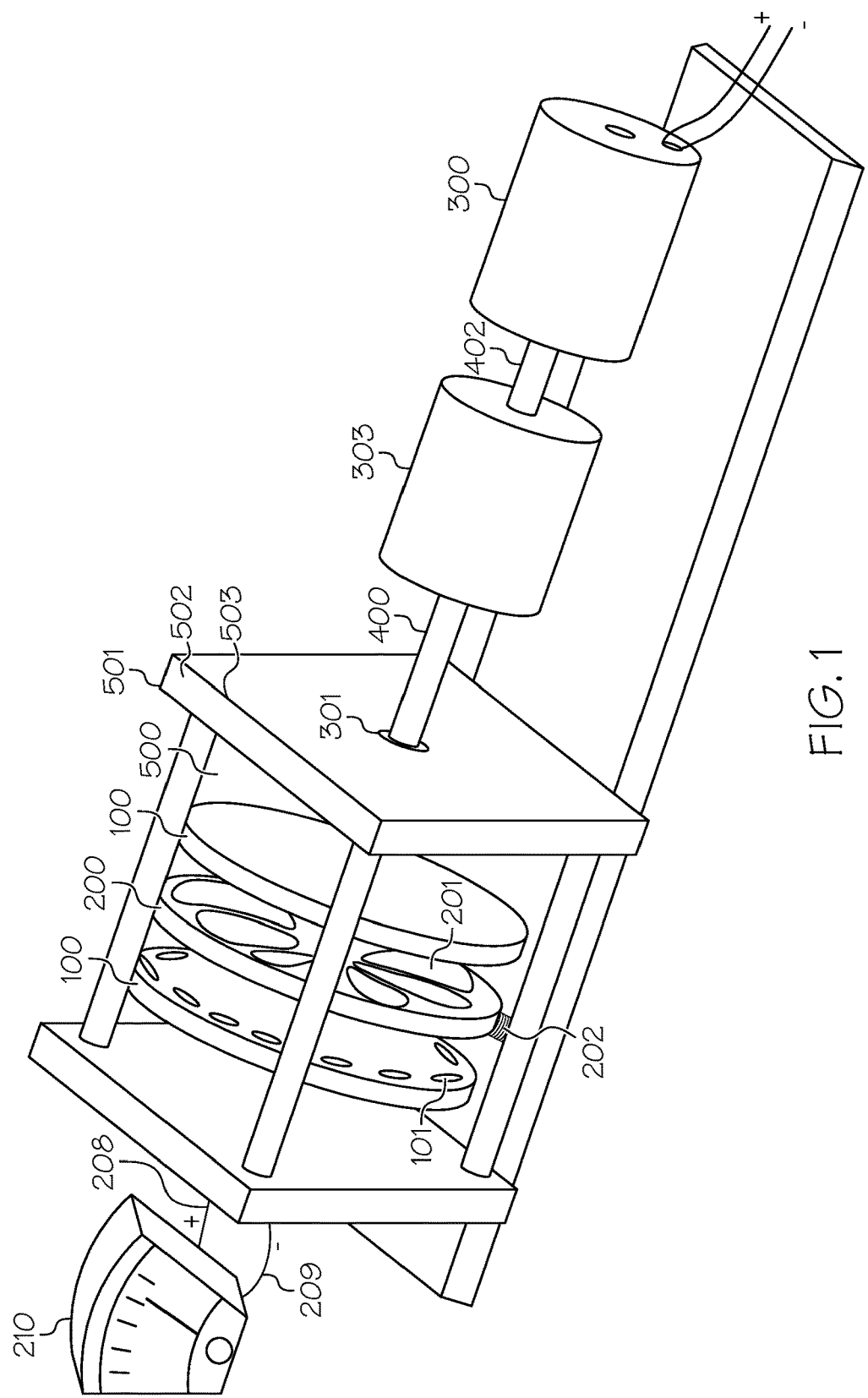
FIG. 1 is a side view of an embodiment of the present invention showing an apparatus having two magnets rotors with mounted magnets and one coils plate apparatus, according to an embodiment of the present invention.
Figure 5:
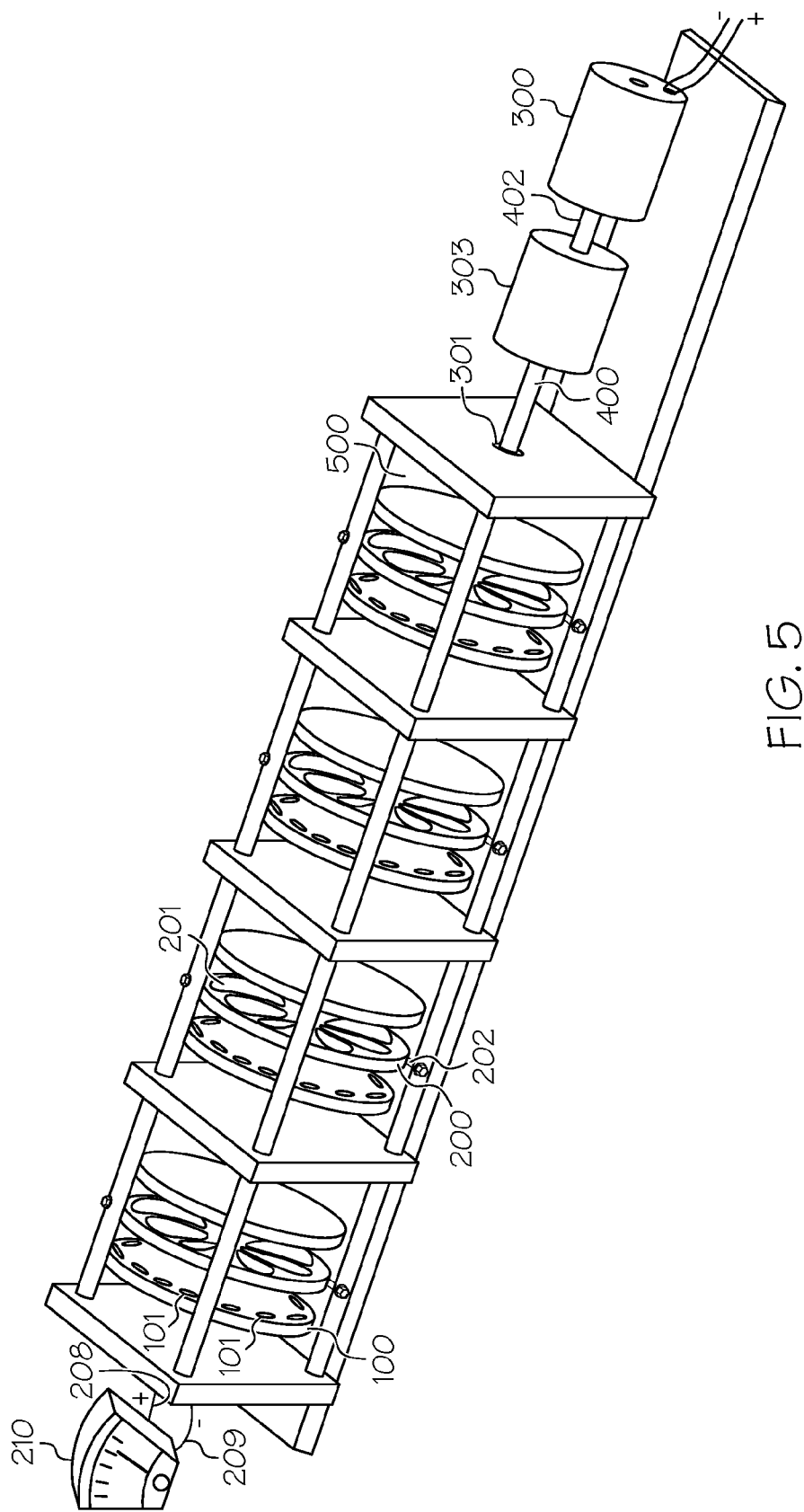

FIG. 5 is a peripheral view of another embodiment of the present invention, quadrupling the coils plate and magnets rotor arrangement of FIG. 1 into four successive units driven by one motor and one gearbox to produce electrical current.

Figure 6:
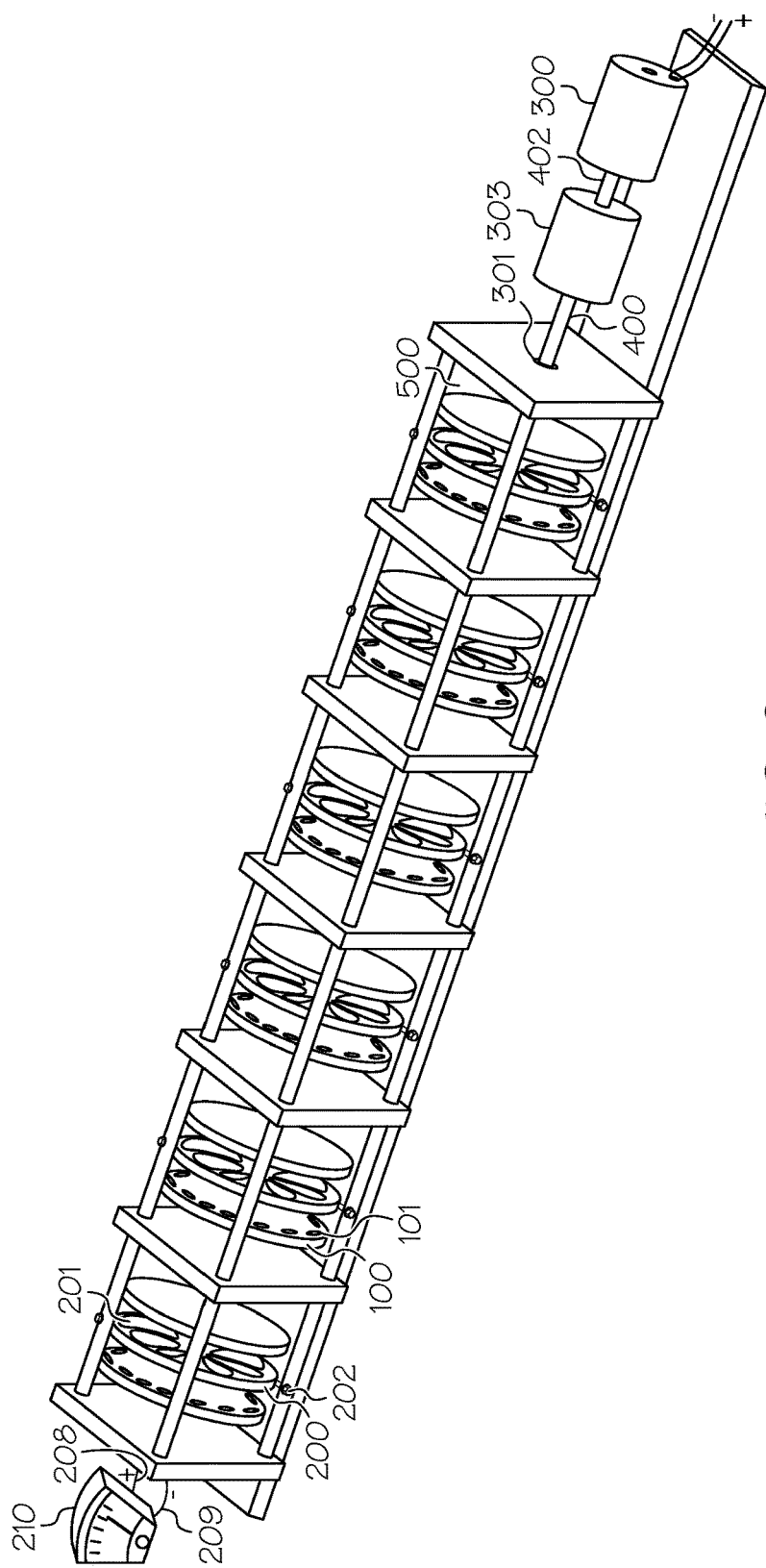

FIG. 6 is a peripheral view of another embodiment of the present invention, unifying six of the coils plate and magnets rotor arrangements of FIG. 1 into six successive units driven by one motor and one gearbox to produce electrical current.

Figure 7:
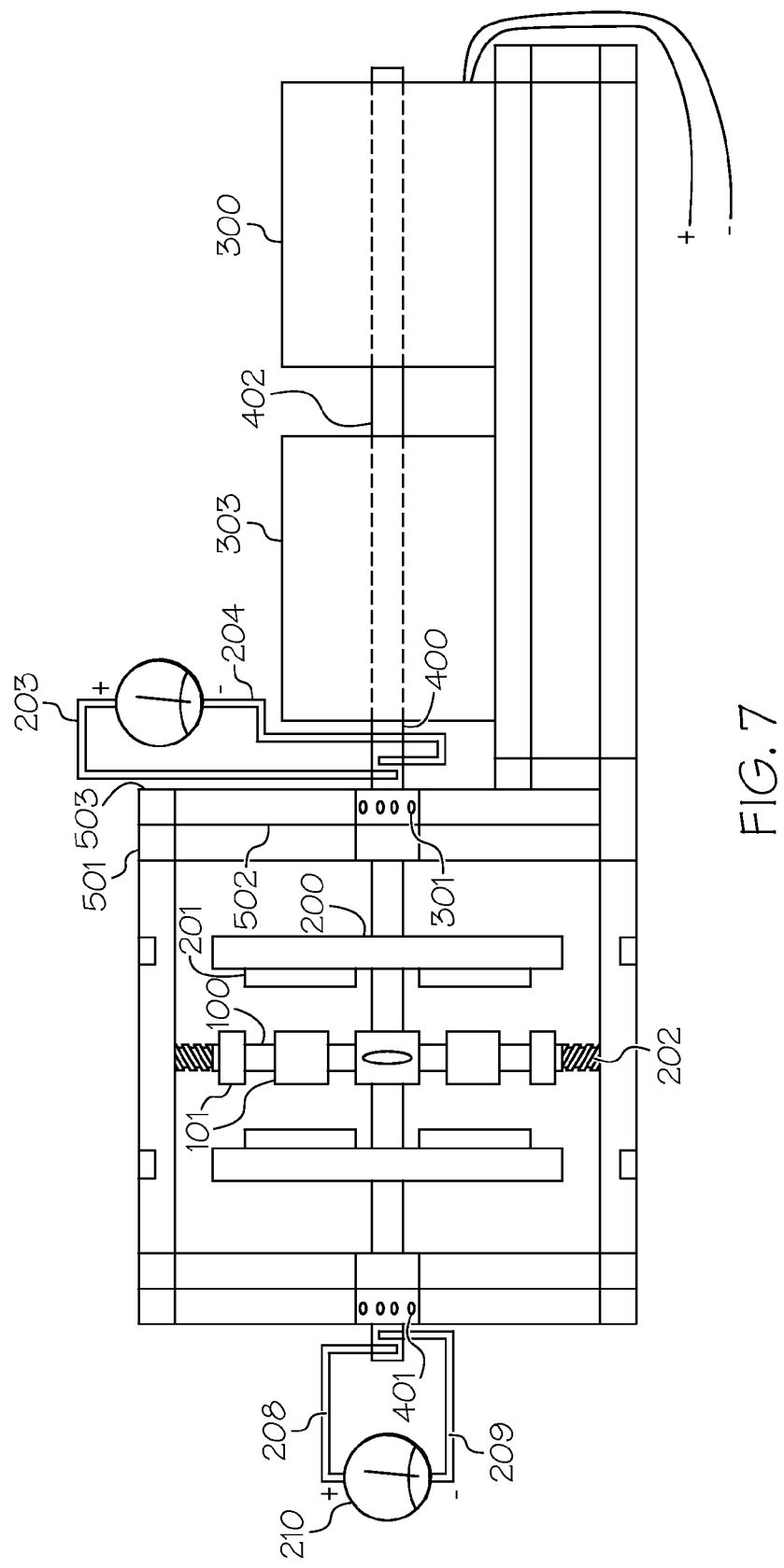

FIG. 7 is a front interior view of another embodiment of the present invention with rotation of coils plates while two magnets rotors do not rotate but remain stationary. One coils plate is mounted on a coil frame apparatus between two stationary magnets rotors, with coils plate being sandwiched with magnets rotors very close to the coils but neither magnets rotors nor coils plate touching or brushing one another; and forming a centrifuge-like arrangement.

Figure 8:
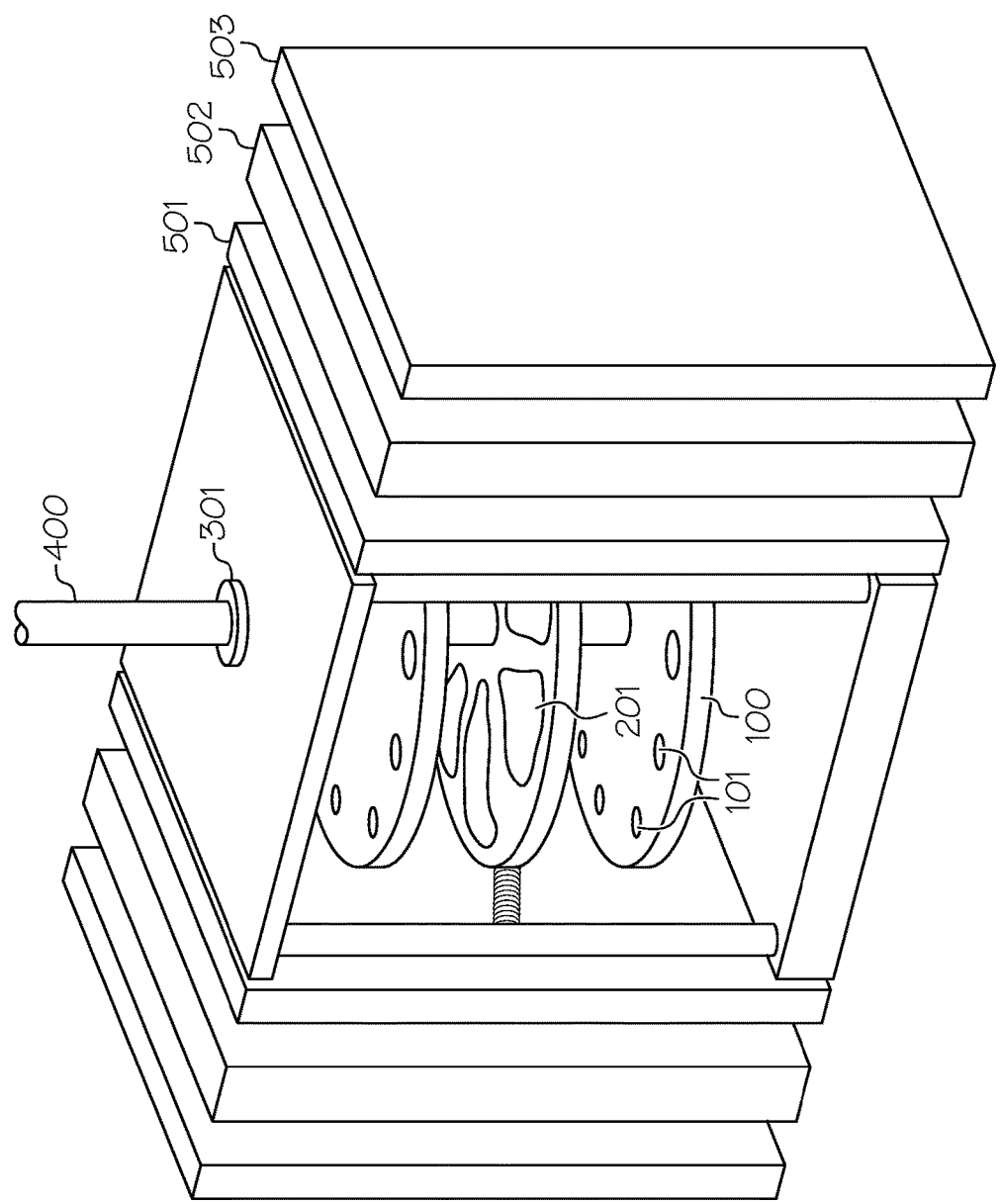

FIG. 8 is a front, top view of an apparatus according to an embodiment of the present invention.

Figure 9:
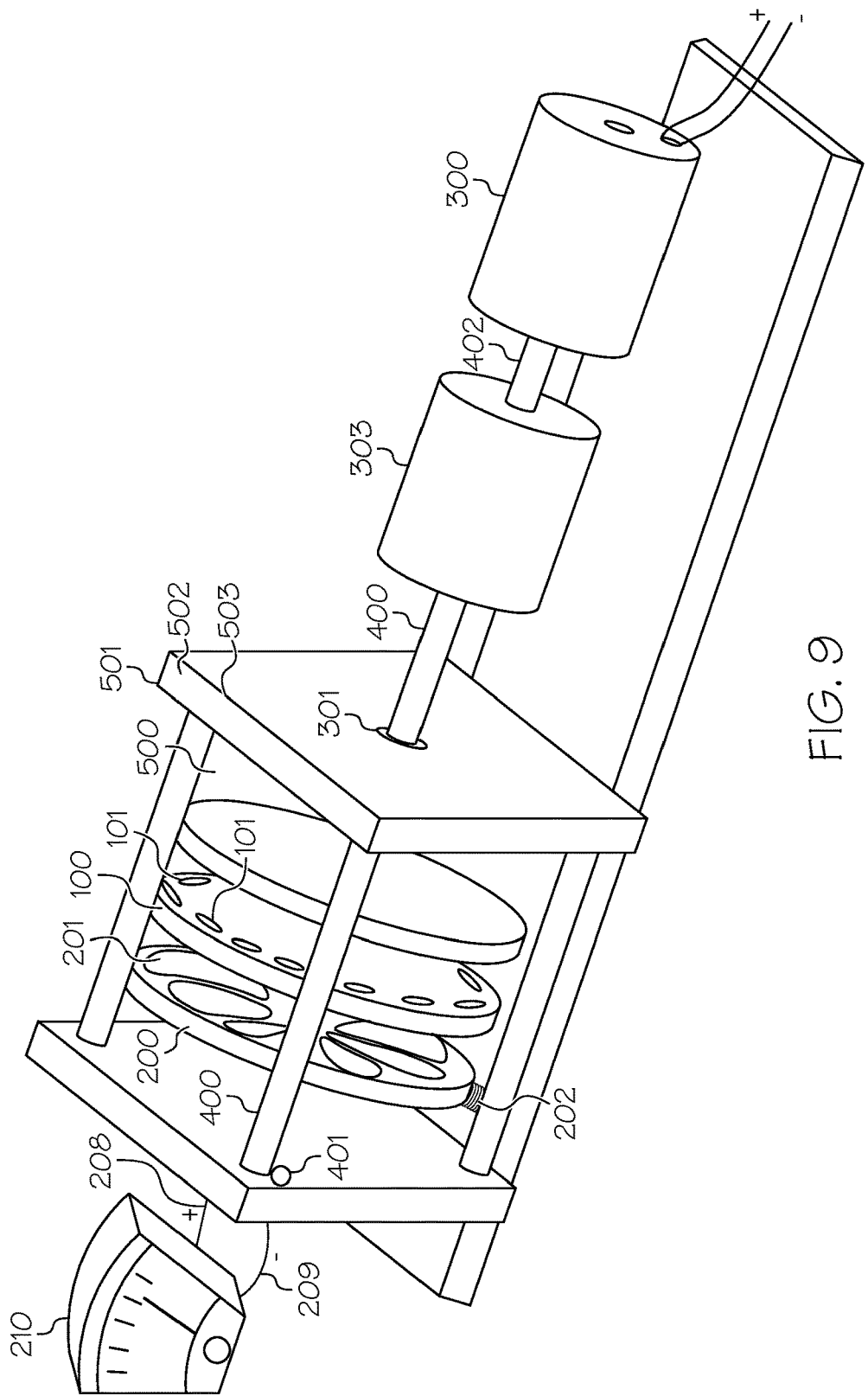

FIG. 9 is front view of another embodiment of the present invention showing an apparatus having two magnets rotors with mounted magnets and one coils plate apparatus.

Figure 10A:
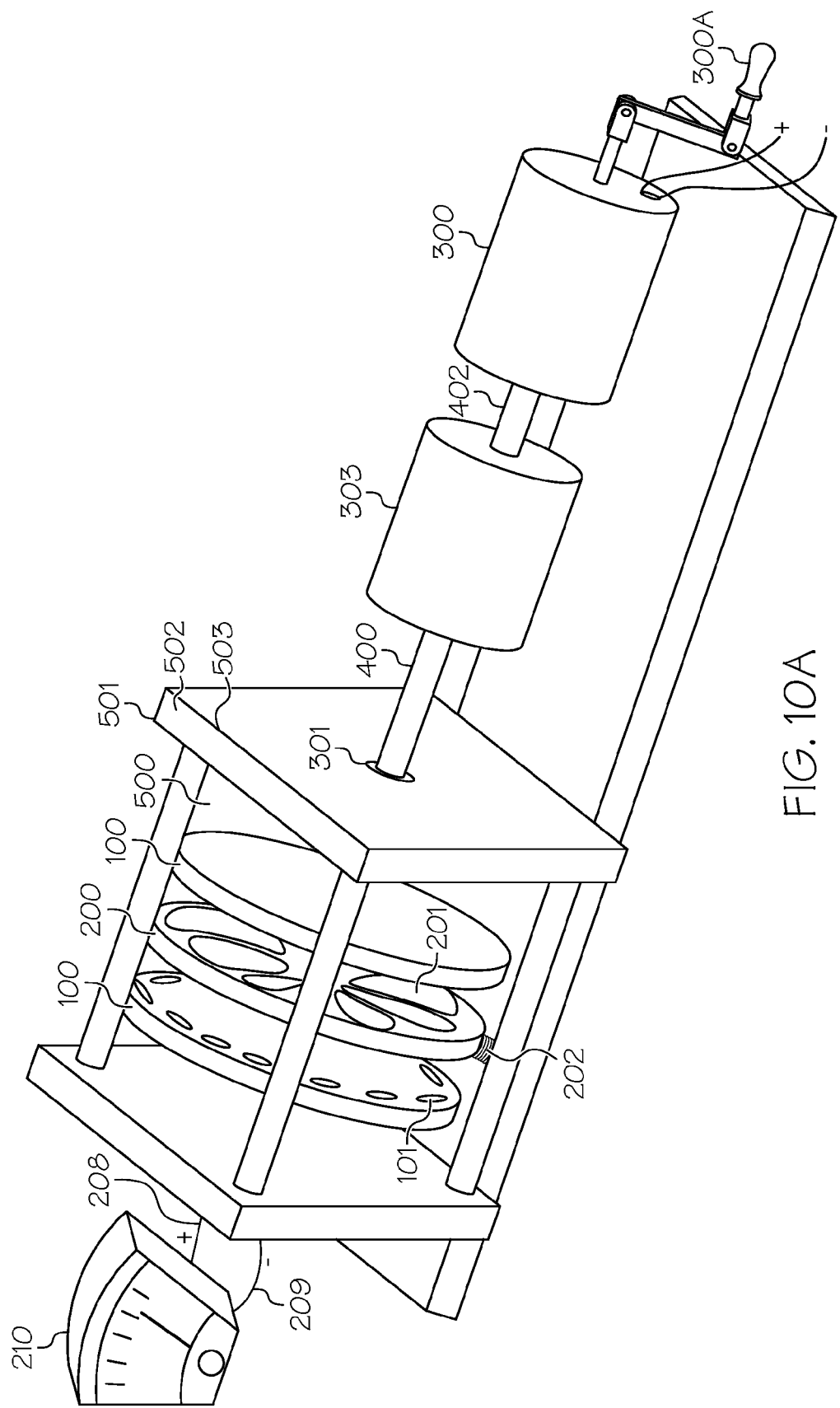

FIG. 10A is a view of an apparatus driven initially by a hand crank, according to an embodiment of the present invention.

Figure 10B:
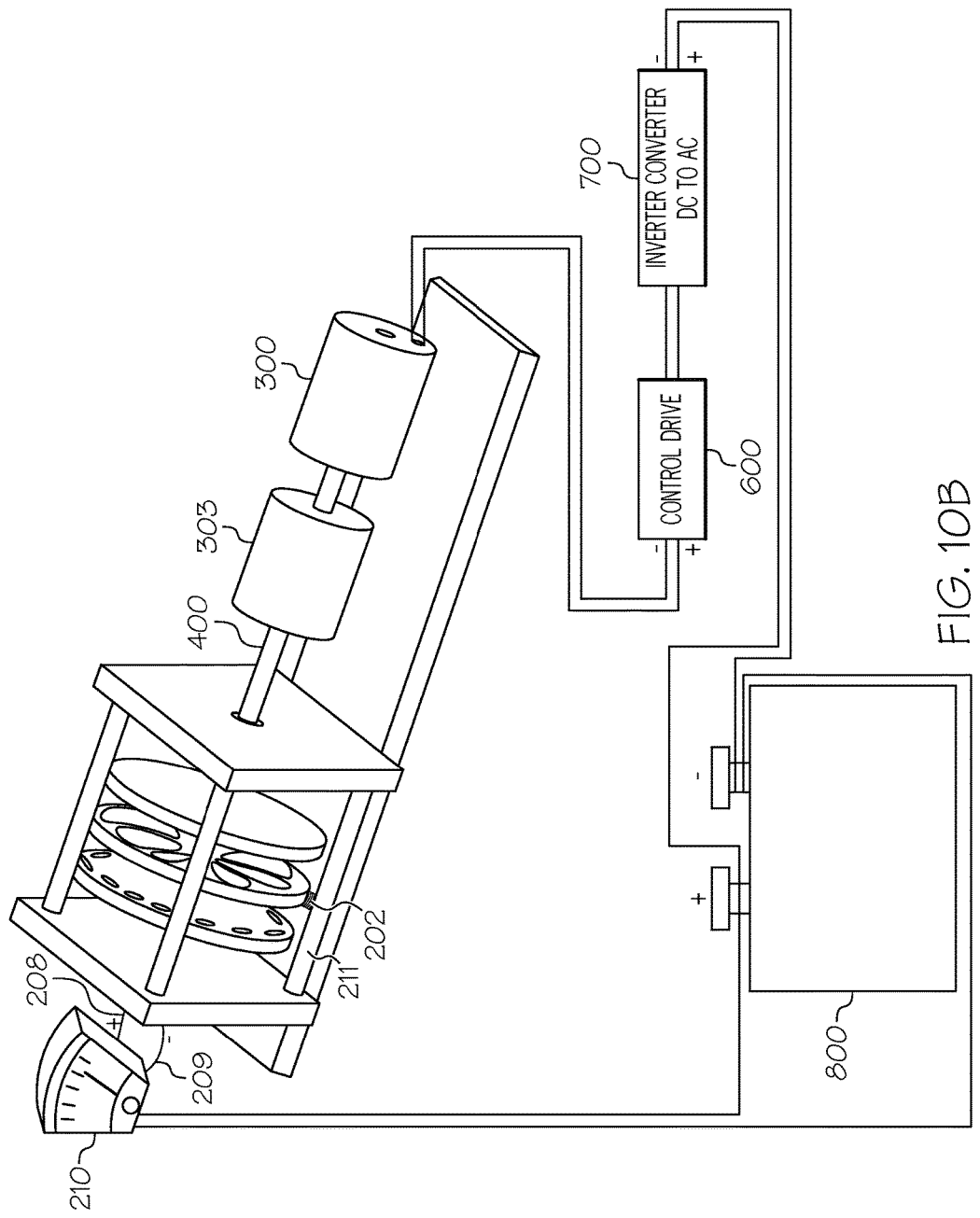

FIG. 10B is a view of an apparatus driven initially by a mechanical apparatus such as a motor energized or powered by a DC/AC battery, according to an embodiment of the present invention.

Figure 10C:
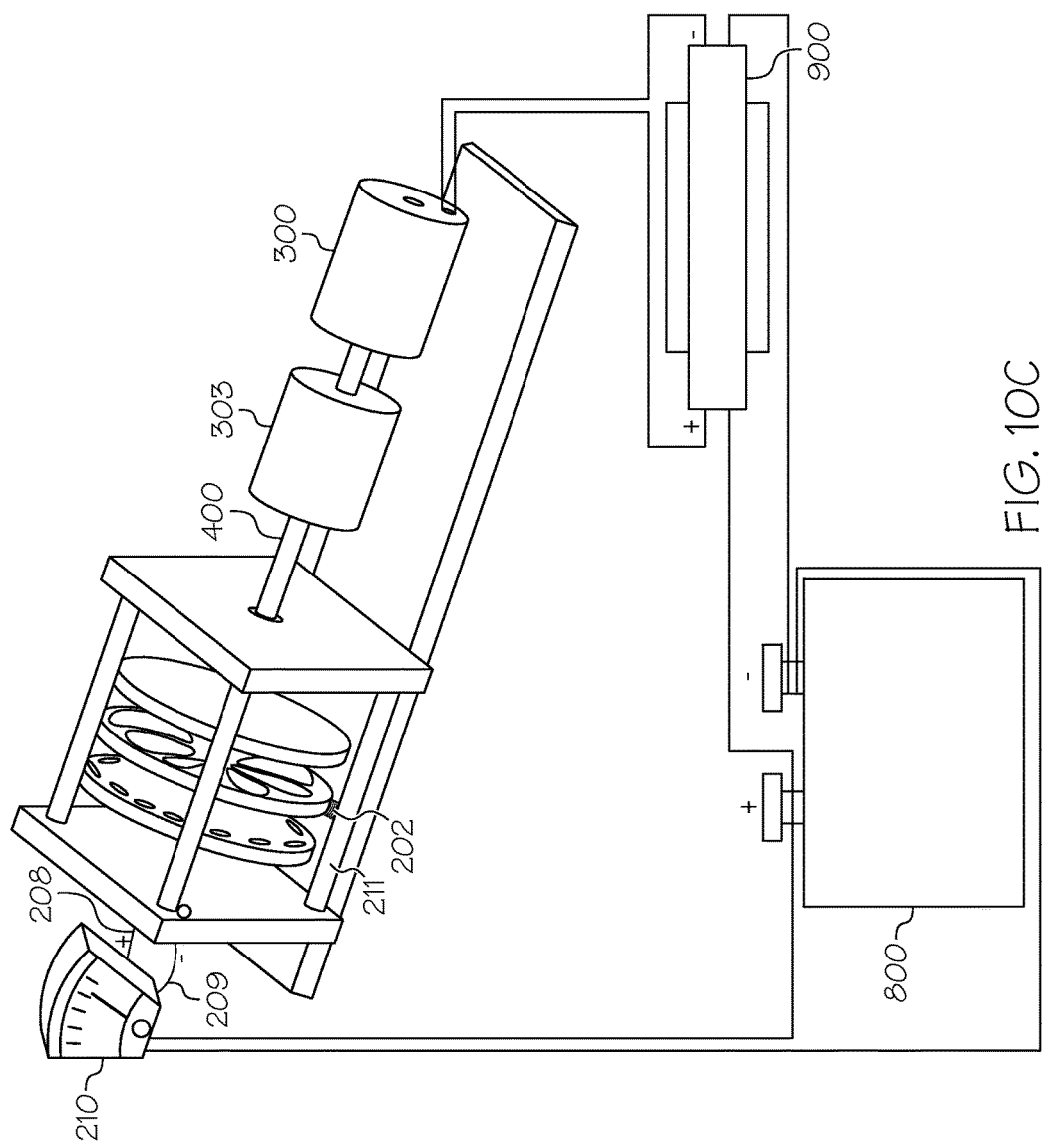

FIG. 10C is a view of one or more capacitors apparatus or other like electrical device acting as a pass-through device to pass electricity to a motor, according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," "exemplary embodiments," or similar language, means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily all refer to the same embodiment.

Figure 2:
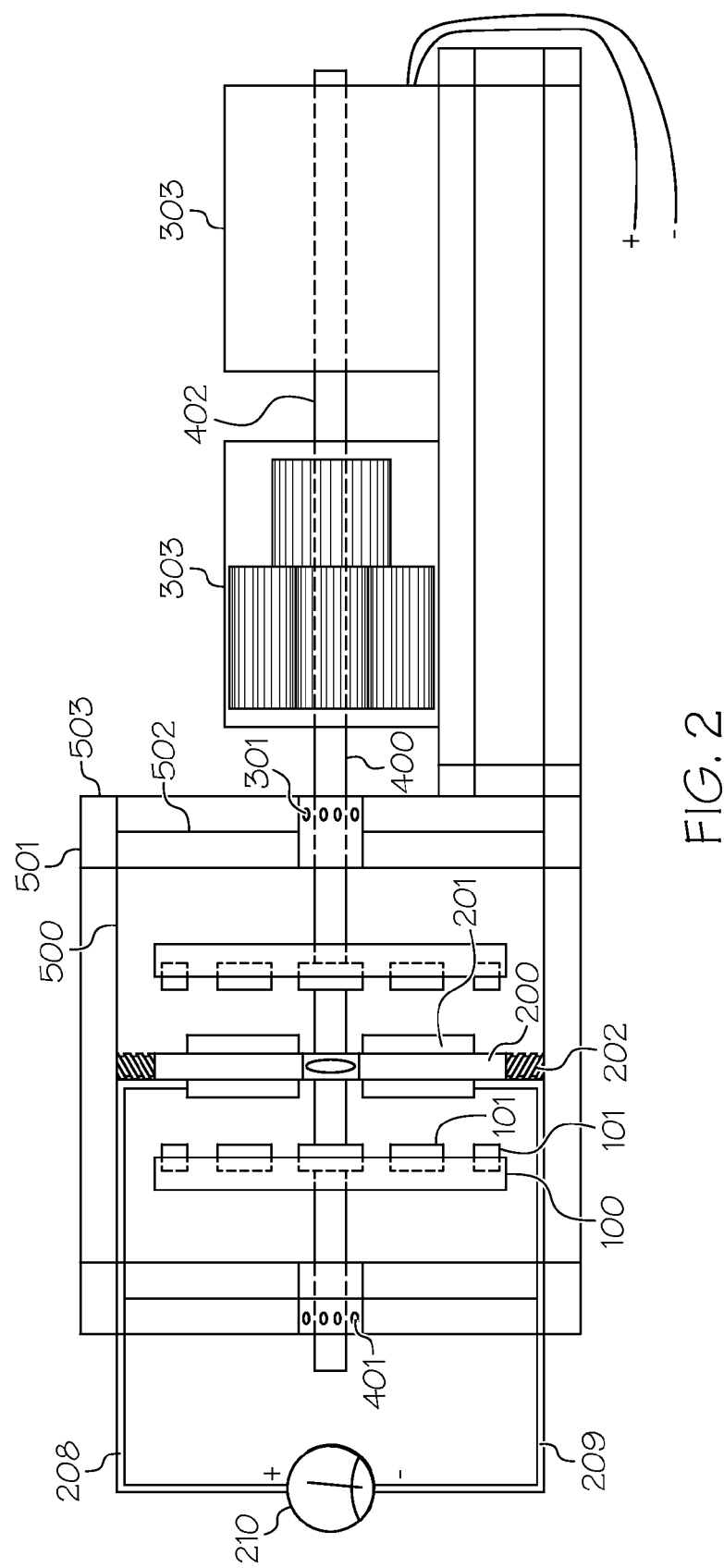
FIG. 2 is a top-down interior view of an embodiment of the present invention.
Figure 3:
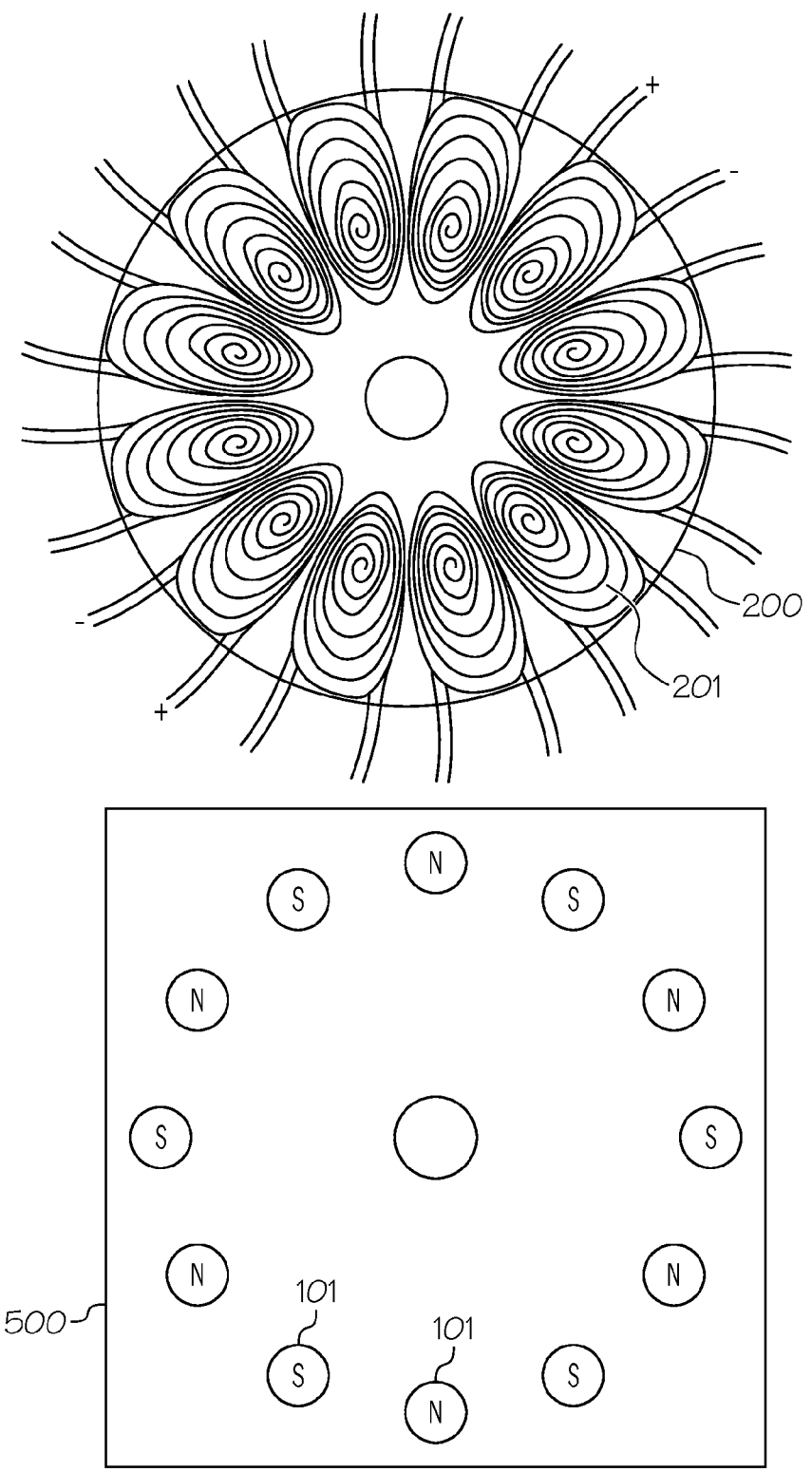
FIG. 3 is a front view of an embodiment of the present invention utilizing one mounted coil plate arrangement (left)

Referring now to FIGS. 1, 2 and 3, embodiments of the invention provide one or more stationary coils positioned by or above or below or beside a magnet or a rotor of magnets with one or more magnets with one or more imbedded magnets, similar to an inner arrangement of a Shurite amp meter. Magnets may be imbedded along an outer part of a disc-like rotor, like the numbers on a clock, and may be numerous and close or few and far apart from each other. Also the one or more coils are held in a coils plate, generally essentially parallel to the magnet rotor. The coils may be placed on an outer part of the plate apparatus and may be placed closer or further apart like the numbers on a clock. The provided apparatus further comprises a shaft having a gear ratio for turning the rotor of magnets, such as by hand or by a motor in order to achieve a high turning velocity. The magnets generate an electromagnetic field, which when rotated against the stationary metal coils, produce an electric current.

In embodiments of the present invention, there is no minimum or maximum number of magnets or coils embedded on any device such as a rotor or plate. In one illustrative embodiment, magnet rotors 100 may each comprise 32 magnets 101 and coil plate 200 may comprise 8 coils 201. In general, the more magnets 101 and the more coils 201 that are added in the magnet rotor 100 and coil plate 200, the greater electromagnetic field is generated. This permits a higher electrical potential to be created (measurable for example in volts (V)) and more electrical current to be generated (measurable for example in amperes (A)).

In some embodiments, magnets 101 on rotor 100 may be placed and spaced apart from one another by half an inch to many inches, similar to numbers on a clock. Likewise, coils 201 on plate 200 may be placed and spaced apart from one another by half an inch to many inches, similar to numbers on a clock. Coils and magnets do not need to be in equal numbers, but should be positioned in close proximity to permit the magnetic field of magnets 101 to interact with coils 201. In any case, magnet rotor 100 and magnets 101 can be rotated by mechanics apparatus 300 (comprising, for example, a hand-propelled device like a crank or by a motor energized or powered by a battery or by one or more capacitors). When rotated in the presence of coils 201, magnets 101 create a Faraday electric field for the self-generation of electrical current.

In an embodiment of the present invention, the holding apparatus devices (e.g., magnet rotor 100 and coil plate 200)

for magnets 101 and coils 201 may be any shape or size, such as a plate, disc, rotor, or a clock with recesses wherein one or more of the magnets or coils may be inserted or imbedded. Likewise, magnets 101 may be of any size and shape and may be made of any magnetic material, including rare earth magnets. Coils 201 may be of any size and shape and may be made of metals or electrical or conductive material. Coil 201 may in some embodiments comprise a single solenoid coil which may be rotated or stationary, and may be positioned in the apparatus of the present invention in lieu of the coil plate 200. Magnet rotors 100 are fastened and secured to frame 500 of the energy machine apparatus by a strong support of wood, plastic, metal, or other strong material, comprising support rod or shaft 400 or two or more rods or shafts 400. Magnet rotors 100 or magnates 101 may be further supported or balanced by bearings 401 and 301 at the ends of the rods or shafts 400, which are attached by the use of bearings and couplings to frame 500 of the energy machine apparatus.

Frame 500 may be made of plastic, wood, metal, or any other material, although a heavy, strong material is preferable to balance the rotation of magnet rotors 100 (or coil plate 200 as discussed below with respect to FIG. 7). It is generally preferable in embodiments of the present invention that the material from which magnet rotor 100, coil plate 200, and shafts or rods 400 are made be strong and resilient to withstand strong electromagnet forces and electromagnet torque electricity load created by operation of embodiments of the energy machine apparatus. Likewise, bearings 401 and 301, fastened to the walls of frame 500, may be made of wood, metal, or plastic, or any other a strong material to support strong electromagnet torque and for balance from the velocity of rotor(s) 100 (or plate 200, as discussed below with respect to FIG. 7). It should be understood that magnets 101, rotors 100 and/or coils 201, coil plates 200 may potentially weigh hundreds or thousands of pounds depending on the needs and requirements of a particular embodiment of the present invention. Accordingly, when one of the coil(s) or magnet(s) rotates, the structures supporting them should be balanced and stable to avoid friction that could cause easy and early wear and tear of the parts of the energy machine apparatus. It should also be generally understood that in embodiments of the invention both magnets 101 and coils 201 cannot be rotated at the same time to generate electricity.

Referring now to FIGS. 1, 2 and 3, rotary motion may be induced in magnet rotor 100 of set of magnets 101 by mechanics apparatus 300, which may drive magnet rotor 100 at any rotational speed (measured, for example, in revolutions per minute (RPM)) via shaft 400, while coil plate 200 remains stationary. For example, magnet rotor 100 may be rotated by mechanical apparatus anywhere between 5 RPMs to over 100,000 RPMs, such that set of coils 201 cut across the flux lines of a magnetic field created by set of magnets 101. This ultimately causes the generation of electric currents in coils 201 when set of coil 201 cut across the magnetic field or flux lines of set of magnet 101.

Referring now to FIGS. 10 A-C in addition to FIGS. 1, 2, and 3, mechanics apparatus 300 may be driven initially by one of several mechanical, chemical, or electrical means. For example, as shown in FIG. 10A, mechanics apparatus 300 may comprise or be attached to a hand-crank 300A. Mechanics apparatus 300 may further comprise a motor 300 which is energized or powered by hand-crank 300A. In other embodiments, as shown in FIG. 10B, motor 300 may be initially energized or powered by using the DC/AC battery 800. In some cases, electrical current from battery 800 may be passed through DC to AC converter 700 and/or a control drive 600 before being used to power motor 300. In still other embodiments, as shown in FIG. 10C, motor 300 may be initially powered by capacitor drive 900 or a similar capacitor apparatus or similar pass through device attached to battery 800 or a similar power source.

Referring back to FIGS. 1, 2, and 3, in embodiments of the present invention, motor 300 and gear ratios 303 may be combined to generate revolutions per minute (RPMs) from 5 RPMs to over 100,000 RPMs by the mechanics apparatus of the present invention. In laboratory testing, it was demonstrated that, the higher the RPMs, the higher the resultant voltage (and likewise amperage and wattage) created in the mechanics apparatus of embodiments of the present invention.

Numerous magnet and coils apparatus units as shown in FIG. 1 may be arrange in series and driven by a single mechanics apparatus 300. For example, as shown in FIG. 5, four magnet and coils apparatus units may be arranged in a series and driven by shaft 400 attached to mechanics apparatus 300. In FIG. 5, a total of eight magnet rotors 100 are shown, each having a plurality of magnets 101. A pair of magnet rotors 100 each sandwich a coil plate 200, each having a plurality of coils 201. Likewise, in FIG. 6, six magnet and coils apparatus units are shown arranged in a series and driven by shaft 400 attached to mechanics apparatus 300. In FIG. 6, a total of twelve magnet rotors 100 are shown, each having a plurality of magnets 101. A pair of magnet rotors 100 each sandwich a coil plate 200, each having a plurality of coils 201. It is understood that the sequence magnet and coils apparatus units is not limited to four or six as shown in FIGS. 5 and 6 respectively, but rather any number of units may be used. Likewise, there is no limit to the number of individual magnates 101 and coils that may be arrayed across the units.

As discussed above, embodiments of the present invention provide a method and apparatus for creating electricity on a tangible scale. In one embodiment, similar to the arrangement inside a Shurite amp meter, a set of magnets 101, having magnetic force can be placed above or below or beside a set of coils 201 in close proximity to create electricity when one of the sets is rotated. Either magnets 101 or magnet rotor 100 comprising the set of magnets 101, as shown in FIG. 1, or coils 201 or coil plate 200 comprising coil(s) 201 as shown in in FIG. 7 are rotated while the other plate or rotor remains stationary. A magnetic field surrounds set of magnets 101 and so long as set of coils are within and cutting across the flux lines of magnet 101 or magnet rotor 100 electrical current is created in metal coils 201. Such electrical current may be used, for example, for residential and commercial uses as well as electricity to power motors and motor vehicles.

As used herein "Magnetic Field Realm" and "Electric Field Realm" refer to the "Electromagnet Field Realm" referred to in the present invention. And at the core and basis of the Electromagnet Field Realm is the Electron Field Realm. In general, the stronger magnet 101 is, the more electrons available to it, the more potential electric energy may be generated by operation of the energy machine apparatus of embodiments of the present invention. More specifically a stronger magnet radiates more flux lines, which when intersected, due to rotation of magnet rotors 100 or coil plates 200, by metal coils 201 containing loose electrons, the electrons are induced to flow, generating electric current. In laboratory, it has been shown that the magnetic field cannot exist without the electric field and likewise the electric field cannot exist without the magnetic field, thus the unified Electromagnet Field Realm of the magnetic and Electric, of North and South poles, of Negative and Positive charges of electricity, of the Attraction and Repulsion forces of this Electromagnet Field Realm, of the Mass and Momentum or the Motion of Mass velocity, all the foregoing forming the unified Electromagnet Field Realm of embodiments of the present invention, as explained below, wherein electrical current is created safely using the energy machine apparatus of embodiments of the present invention to provide mechanical force to self-generate electricity and power itself.

Referring now to FIGS. 1 through 9, set of magnets 101 and set of coils are placed in magnet rotor 100 and coil plate 200, respectively, which in some embodiments may have recesses in which magnets 101 or coils 201 are firmly secured to withstand the Electromagnet Field Realm's electric and magnetic torque forces. In some embodiments, each coil 201 or magnet 101 may be held in place by glue or screws or any other material that will hold coil 201 or magnet 101 firmly in place during rotation. Each magnet rotor 100 and coil plate 200 may have any numbers of magnets 101 and coil 201, respectively, in any size and/or shape. As an alternative to a single magnet, an array of magnets may be used on magnet rotor 100. Also, an array of many coils may be used on coil plate 200.

In some embodiments, the magnets are rare earth magnets, and may include neodymium magnets, and/or samarium-cobalt magnets. In some embodiments, magnets 101 are the same sizes and have the same surface Gauss, and in other embodiments, the magnet can be different sizes with different Surface Gausses from one another. Magnets with stronger and wider magnetic field may be used as desired to configure embodiments of the present invention.

In some embodiments, coils 201 may be the same sizes and have the same gauge wires, and in other embodiments, coils 201 may be different gauge wires with different metal or copper wires from one another, wherein only the total resistance (Ohms) would be different. For example, copper wires, silver wires, tungsten wires, gold wires and other conducting wires of different gauges could be used together to generate more or less electric current depending on a desired configuration and needs or requirements. Silver, tungsten and gold wires will permit larger amounts of electricity than copper but copper is more cost effective and makes the energy machine apparatus of embodiments of the present invention more cost effective. In some embodiments of the present invention coils 201 may be one or more triangular, rectangular, or square coils. In still further embodiments, coils 201 may be shapes such as a trapezium and a trapezoidal and other like shapes.

A set of winding metal coils 201 may be formed by winding a long copper (or other metal) wire in the shape of a spiral. The coil(s) 201 act similar to a magnet when a current is turned on or induced. Metal coil 201 possesses similar magnetic lines of force around it as an ordinary magnet does, and also forms part of the Electromagnet Field Realm of embodiments of the present invention. As discussed below, whenever magnetic lines cut across winding metal coil(s) 201 in a full circuit based on the revolutions per minute, an electric current is generated over a load (e.g., scale 210 or other receiving device).

According to Faraday's law, electricity is produced whenever magnetic lines of force of magnet 101 cut across the metal (e.g., cooper) loop wire coil(s) 201, which is part of a complete circuit. This may occur when the copper loop wire coil(s) 201 is in motion (FIG. 7), or when the magnet(s) 101 is in motion (FIG. 1), to generate electricity.

It should be understood that electricity is generated with each 360 degree revolution of magnet rotor 100 or coil plate 200, and that the quantity of electricity produced is related directly to the number of coils 201 employed. For example, wherein one coil generates 2× electricity, two coils generate 4× times the electricity wherein three coils generate 6× times the electricity. This aspect of the invention of adding coils has no limit to the number of coils so long as the coils are within the magnetic field of magnet rotor 100 or magnet(s) 101.

In some embodiments of the present invention, magnet rotor 100 or the centrifuge device of FIG. 8 (see below) may be rotated by any attached mechanics apparatus 300 with mechanical device 303 secured to mechanics apparatus 300 also in motion. In some embodiments, mechanics apparatus 300 may comprise a motor 300. Motor 300 may be plugged into an electrical outlet or other electrical source, such as a battery, which may be inverted or rectified from DC to AC if a DC battery. In other embodiments, rated electrical volts and amperage or watts may be supplied to the motor 300 using a pass-through device such as a battery (e.g., 6 volts, 12 volts, 24 volts, 48 volts or lower or higher Volts Battery) or a device with rectifier capacitor(s) or other electrical devices sufficiently adequate to be used as a pass-through device to provide the voltage, amperage, and wattage to meet the requirements of a particular motor 300. Motor 300 is used to rotate magnet rotor 100 or coil plate 200 to start self-generating electricity. Once started, this same electricity being generated can at the same time be used to power Motor 300.

Electricity generated by the energy machine apparatus of embodiments of the present invention may be used to recharge the battery or batteries being used to start energy machine apparatus while also powering another load, such as a home or a building or other motors or applications. Once magnet rotor 100 or coil plate 200 or the centrifuge of FIG. 8 generate a threshold level of energy, motor 300 can be unplugged or disconnected from a utility and is no longer necessary to power the rotating of rotor 100 or plate 200 as energy machine apparatus may now power itself using an electrical device like rectifier capacitor(s) or other electrical sufficiently devices adequate to be used as a pass-through device to provide the voltage, amperage, and wattage to meet the requirements of the Motor 300 while providing electricity to power to another loan, such as a residential, commercial enterprises or other devices, machines or motors of any size.

In another embodiments of the present invention, as showing in FIG. 7, instead of rotating one or more magnet rotors 100, a set of coils 100 are placed and imbedded on coils plate 200 that is rotated by attached apparatus or mechanical device or motor 300 providing the mechanical force of motion while magnet rotor 200 with set of magnets 101 are stationary and provide flux lines in close proximity to the rotating coils for the generation of electrical current.

Referring now to FIGS. 1 and 2, in a related embodiment, one or more rotors 100 are attached to a shaft 400 secured into bearings 401 and 301 on opposite sides of rotors 100 and secured into the walls of the energy machine apparatus frame 500 by bearings and couplings 401 and 301. In a preferred embodiment, bearings and couplings 401 and 301 are strong and resilient, but non-magnetic. In some embodiments, wires 208 and 209 are attached to meter or load 210 to form an electric circuit, and meter 210 may be configured to display a voltage, amperage, or wattage reading.

In some embodiments, a single shaft is used for one or more magnet rotors 100 wherein imbedded magnets 101 are being rotated or in motion and only one shaft 400 holds magnet rotors 100. Meanwhile coil plate 200 with coils 201 is stationary. The Positive 208 and Negative 209 wires for the electric field and circuit, may be attached directly to coils 201. Coil plate 200 may be centered around, but not in contact with rotating shaft 400 and remains stationary and secured by holding apparatus 202, which may attach coil plate 200 to frame 500.

In an alternative embodiment, as shown in FIG. 7, coil 201 or one or more coil plates 200 are instead attached to a shaft 400 secured into bearings 401 and 301 on opposite sides of coil plates 200 and secured into the walls of the energy machine apparatus frame 500 by bearings and couplings 401 and 30. In this embodiment, electricity is generated by rotating the attached coils in the energy machine apparatus while single and separate shafts are attached to either side of magnet rotor 100. Positive and negative wires 208 and 209 with wires or brushes may be attached to respective shafts of each coil plate 200, wherein coil plates 200 with coils 201 are rotated by mechanics apparatus or motor 300. Electrical energy may be captured where each shaft rotates against the wire brushes. Meanwhile, magnet rotor 100 with set of magnet 101 is stationary in the embodiment shown FIG. 7 and may be secured to frame 500 by holding apparatus 202.

In the foregoing embodiments of the invention, magnet rotor 100 or coil plate 200 may be heavy (e.g., weighing hundreds or thousands of pounds) and therefore the angular momentum of magnet rotor 100 (FIG. 1) or coil plate 200 (FIG. 7) once in motion by a mechanics apparatus that rotates the magnet(s) or coil(s) at a high velocity or revolutions per minute (RPM), the magnets 101 or coils 201, respectively, will continue to turn easier on their own in a 360 degree motion for a considerable time period with little torque being required by mechanics apparatus 300 to magnet rotor 100 (FIG. 1) or coil plate 200 (FIG. 7). Angular Momentum as per FIGS. 1, 5 and 6 provides additional torque propulsion force which is Electromagnet Centrifuge Propulsion Torque force because of the velocity or RPM or magnet rotors and the weight of magnets and rotors while coils 201 are stationary, or in the case of FIG. 7 where coils 201 are rotated while magnets 101 are stationary. In any case, the weight of either may be being rotated by 5 RPM to 3900 RPM to over 100,000 RPM range and may weight from 50 pounds to hundreds or thousands of pounds. Such foregoing weight being rotated continuously (e.g., 24×7) creates momentum of mass and alleviates the torque force requires to rotate a magnet or coil centrifuge, therefore overcoming Electromagnet Centrifuge Propulsion Torque to permit embodiments of the present invention to generate more electrical current with less energy from motor 300 or gear ratio 303 or any part of the mechanics apparatus. The less work or torque being done by motor 300 or gear ratio 303 or mechanics apparatus, the less wear and tear on the motor and gears and the longer the life of the mechanics apparatus and gears, and the less maintenance costs.

It should be recognized that some embodiments, any mechanical force or any motor 300 of any size may be used to create RPMs so long as the mechanical force turns magnet rotor 100 (FIG. 1) or coil plate 200 (FIG. 7). So long as set of magnets 101 or magnet rotor 100 is attached to Motor 300 or Mechanics Apparatus, and rotated with set of coils 201 cutting across magnet flux lines, electricity is created. Likewise, in some other embodiments, a hand-propelled or mechanical device or motor 300 or other mechanics apparatus may be used to rotate a shaft or shafts 400 such that when the mechanics apparatus moves or rotates, the shaft moves or rotates and in turn moves or rotates magnet rotor 100 (FIG. 1) or coil plate 200 (FIG. 7), creating electricity.

Embodiments of the present invention also comprise a load or receiving device. In an example embodiment, the receiving device may be a micro/milliamp meter (also referred to herein as "scale") 210. The scale 210 is merely an illustrative example, and is not intended to be limiting. It is merely intended to show that electric current is generated through embodiments of the present invention. Scale 210 may also be referred to or regarded herein as a receiving device that ultimately makes use of the electric current generated, and measures the voltage, amperage, or wattage being generated and used by embodiments of the present invention.

Referring now to FIG. 4, in another embodiment of the invention, only a pair of magnet rotors 100 are shown attached to rotating shaft 400. Between rotors 100 is coil plate 200, comprising one or more coils 201. When rotating shaft 400 spins magnet rotors 100 the flux lines of the magnet (s) 101 are crossed or cut by the coil or coils, creating electrical current. In the embodiment shown in FIG. 4, electrical wires 208 and 209 may be disposed along rotating shaft 400 for transfer of electrical current to load 210. This electrical transfer may be achieved, for example, at plate 200 by wire brushes disposed on stationary plate 200 or rotating shaft 400 at the end of shaft 400 by wire brushes, also disposed on stationary external wires or rotating shaft 400.

Referring now to FIG. 9, in another embodiment of the present invention, a single off-center magnet rotor 100 with set of magnets 101 is present in energy generator machine apparatus according to an embodiment of the present invention along with a coil 201 or coil plate 200. All other elements of the electricity generator as discussed above in other embodiments remain the same. As set of magnet(s) 100 rotates, their flux lines are cut across by one or more coils 201 or coil plate 200, causing electrical current to be generated. It should be recognized that although the set of coils 201 are shown to the side of the magnets 101, the set of coils 201 can be situated anywhere that, as the one or more magnets 101 rotates, the flux lines of the magnets 101 cut across coils 201.

Accordingly, whether a magnet is inside or outside or to the right or left of the set of coils 201, it still creates an electric field or electric current as long as the one or more coils or magnets are in motion and the other is stationary. Or vice versa, if any outside magnets 101 is in motion and is near a stationary coil 101, it still creates an electric field or electric current. Additionally, in alternative embodiments, the coil and or/magnet may be configured to have linear motion instead of rotational motion. For example, a constant alternating back and forth position may be used in creating an electrical field when passing its magnetic field near the coil. In some embodiments, single magnet rotor 100 may be fixed and a single coil plate 200 may be rotated.

In a preferred embodiment of the present invention, if more than one coils is used, the coils can either be placed or connected in parallels or series-paralleled or in series to generate more or less electric current and power, respectively, based on a desire, needs, or requirement. In any case, electricity is generated. Coils in parallel have lesser resistance (measured, for example in Ohms) and thus permit a stronger electrical current and generate more amperes or watts. However, in general, less voltage is generated.

Embodiments of the present invention provide a method and apparatus for generating electricity by a coil 201 of any size, or shape, or other electrical materials, in motion or any magnet 101 of any size, shape, material, etc. in motion. Motion of the coil(s) 201 or motion of the magnet(s) 101 by a mechanics apparatus or a mechanical device or any motor 300 that moves the coil(s) or magnet(s) such that the coils cut across flux lines of a magnetic field created by the magnet(s), generates electricity. Mechanics apparatus moves magnet or magnets 101 such that the flux lines of magnet(s) 101 cut across the stationary coil(s) 201 creating an electrical field or electricity. In these regards, the force of the magnetic field created by magnet(s) 101 may need to be contained to avoid magnetic interaction with motor 300 or other like mechanical devices or apparatuses or electronic devices in or around the alternative energy machine of embodiments of the present invention.

Magnets, like electrons, protons, neutrons, or atoms have magnetic poles surrounding their mass. Magnetic force, like electric force, or the electromagnetic force, like the electrostatic force, all vary inversely by the square of their distance, like Newton's gravitation or Coulomb's negative or positive charges. Therefore, the rotor 100 and/or coil plate 200 of alternative energy machine of embodiments of the present invention may, in some embodiments, be placed, as shown in FIG. 8, in a centrifuge of stainless, non-magnetic steel 503 that completely surrounds foam 502, and magnetic steel 501 that completely encases or encapsulates or surrounds coil plate 200 and magnet rotors 100. These surrounding structures contain the electromagnet field realm within, and also minimize or block as much as possible the magnetic flux density field of magnets 101 from escaping the centrifuge of FIG. 8. This structure also prevents the magnetic Field Realm propulsion created by the magnets and coils from moving beyond the alternative energy machine frame 500 when a mechanics apparatus rotates coils 201 (as in FIG. 7) or magnets 101 (as in FIG. 1) to generate electricity.

The centrifuge of some embodiments of the present invention also provides the advantage of creating a greater flux density and intensity in the Electric Field Realm and magnetic Field Realm to generate even greater amounts of electrical current, voltage, and wattage, as well as containing the magnetic field as stated. To contain, minimize or block the magnetic flux density field, the steel centrifuge is used in the interior partition plates 501, 502 and 503 walls as explained above. Therefore, partition plates 501, 502 and 503 can be made of steel to contain the magnetic field but can also be of any metal or wood or plastic or heat or any hard material to block or other like substance serving to block or decrease or minimize the flux lines of magnet(s) 101 to avoid interference with the Motor 300 or other like electronic devices or apparatuses or electronics on in or outside the alternative energy machine of embodiments of the present invention. However, Uranium rock material is better than the foregoing because of the radioactive and thus highly charged nature of this rock, but magnetic steel and the metal lead are excellent substances that can also be used in embodiments of this invention or other embodiments of this invention that would serve to block or minimize the flux lines of magnet(s) 101 or the Centrifuge Propulsion force of FIG. 8. Centrifuge Propulsion in embodiments of the present invention of the Self-Powered Alternative Energy Machine is the considerable increase of magnetic flux lines density and intensity created by each FIG. 8 Centrifuge. The higher the magnetic flux lines density and intensity created by this invention is the more electrical current, voltage, and wattage are generated and may be used for a workload. Also, the stronger the current and wattage the less HP, the less FT PD or mechanical force required by the mechanics apparatus or motor 300.

Electromagnet Field Realm:

Magnets and coils, like electrons, protons, neutrons, or atoms have magnetic poles surrounding their mass. magnetic force, like electric force, the electrostatic force, the electromagnetic force, all vary inversely by the square of the distance, like gravitation.

In embodiments of the present invention, the magnetic Field Realm and the Electric Field Realm embodies the Electromagnet Field Realm. At the core of the Electromagnet Field Realm is the Electron Field Realm of atoms comprising and creating the magnetic and electric fields dual forces that form a singularity or a singular force in embodiments of the present invention. The magnetic and electric field is governed by density and intensity of the Centrifuge Propulsion radiating Faraday flux-lines. Flux lines fields are also governed by Maxwell waves or frequencies. In the present invention, flux lines density and intensity of Centrifuge Propulsion radiated by density and intensity of Centrifuge Propulsion increase both the magnetic force of the magnets and the electric force of the coils creating greater amounts of electrical current, voltage, and wattage.

As determined by experimentation with embodiments of the present invention and the a energy machine apparatus according to embodiments, flux-line waves around a magnet are generally constant but never evenly distributed around the surfaces of a magnet from a North Pole to a South Pole on and around the magnet. This North Pole and South Pole field is also diminished and weakened by other electrical and magnetic forces in the magnet's proximity. Consequently, this magnetic and electric field of that nature and as used in the conventional manner is weaker as determined by experimentation. Having a stronger magnetic and electric field generates more electrical current, voltage, and wattage and so is desirable and will afford more cost effective electricity for public use because of less or no investments in additional devices to regulate voltage. Accordingly, embodiments of the present invention do not require transformers, volt regulators, or inverters to increase electrical current, voltage, and wattage. Rather, a strong magnetic and electric field singularity, the Electromagnet Field Realm, creates more energy in the motion of mass or the motion of the magnet or the motion of the coil, in the spin velocity inside the Centrifuge or in Centrifuge Propulsion, proving that the higher the motion of mass, the more radiated are the electrons or atoms in this singular force thus the more electricity is created for public use in a very inexpensive manner. The higher the flux density and intensity, the less work or torque or FT PD being done by mechanics apparatus or motor 300 or gear ratio 303, the less wear and tear on motor and gears and the longer the life of motor and gears and the less maintenance costs of alternative energy apparatus devices.

If sufficient and vast amounts of energy in the form of electrical current, voltage, and wattage are available for public use, embodiments of the present invention provide the added advantage of replacing the use of fossil fuels to protect the environment for the public good and in support of public health. The motion of mass, i.e., coils 201 or magnets 101, respectively, wherein the electrons of coil 201 or coil plate 200 are radiated by the moving magnet flux lines waves or lines caused by motion of motor 300 or any other mechanical apparatus wherein rotation or velocity of magnet 101 or magnet rotor 100 such that copper wire coil 201 cut across the flux lines of the rotating magnet 101 or magnet rotor, the electrons thus generates more energy and electricity in this Centrifuge Propulsion of FIG. 8.

Additionally, as shown in FIG. 3, the use of North Pole and South Pole in embodiments of the present invention's Electromagnet Field Realm may be configured to provide a more powerful singularity to create even larger amounts of electricity. In laboratory, it has been shown that the magnetic field cannot exist without the electric field and likewise the electric field cannot exist without the magnetic field, thus the unified Electromagnet Field Realm of the magnetic and Electric, of North and South poles, of Negative and Positive charges of electricity, of the Attraction and Repulsion forces of this Electromagnet Field Realm, of the Mass and Momentum or the Motion of Mass velocity, all the foregoing forming the unified Electromagnet Field Realm of embodiments of the present invention, wherein electrical current is created safely using the Centrifuge Propulsion to self-generate electricity and self-power, while also powering another load, such as residential and commercial buildings and motors and other devices requiring electricity to operate.

As explained above, all embodiments of the present invention provide a method and apparatus for generating electricity by a coil 201 of any size, or shape, or electrical materials, etc., in motion or any magnet 101 of any size, shape, material, etc. in motion by a mechanics apparatus or motor 300, in order to generate electrical current, voltages, and wattage.

In embodiments of the present invention, as shown in FIGS. 1, 3, and 4, more electrical current, voltages, and wattage are created when alternating North and or South Poles surfaces of the set of magnets 101 or in magnet rotor 100. In some embodiments, magnets 101 may be directly positioned close to coil 201 or set of coils 201 in coil plate 200, with only a thin space between alternating North and South poles surfaces of magnets 101 or magnet rotor 100. This is to maximize magnetic conversion of power to create electrical current, voltages, and wattage, based on the Inverse Square Law and magnetic conversion.

It is generally known in the art that the North and South poles of a particular magnet or magnets are traditionally used for the magnetic field to create electricity in various applications wherein flux lines diverge out from North pole of the magnet to converge in the South pole of the same magnet, like the magnetic poles of Earth. However, a lower flux lines density exists in such an application using the one magnet's North and South Poles which also provides less magnetic conversion for generating electricity and thus this amounts to less electricity power from coil and magnet interaction.

In another embodiment of the present invention and as demonstrated in laboratory, in addition to utilizing this traditional flux lines flow of one magnet 101, for example, whose flux lines density flow from North to South for a single magnet, this invention also utilizes alternating magnets' poles (e.g., FIG. 3) and in their magnetic North and South Poles of magnets 101 or magnet rotor 100 wherein in FIGS. 1, 2, 6, 5, 4, 8 the North Poles and South Poles in each magnet rotor 100 of the Centrifuge (FIG. 8) North Pole of magnet 101 in first magnet rotor 100 directly faces the South Pole of magnet 101 in the second magnet rotor 100 of the same Centrifuge. Each magnet North Pole of one magnet rotor faces directly a magnet South Pole in the other magnet rotor. This method is employed, for example, in the embodiments shown in FIGS. 1, 5, and 6. According to laboratory experimentation, this shift or reroute of North and South Poles of magnets 101 to two magnets 101 (utilizing north pole of one magnet and the south pole of the other magnet) allows more than triple the voltage to be created from 10 gauge copper wire coils 201. This shift or reroute of North and South Poles of magnets 101 is also advantageous by causing the RPMs of the centrifuge to be more stable when amperes or Watts are being used by a combination of motors, household commercial appliances, and light bulbs, negating the need for a voltage regulators or electrical transformers and gears. Notwithstanding the foregoing, embodiments of the present invention may use gears, transformers and voltage regulators to support the electricity generation and regulation.

In an example, when 16 magnets 101 in magnet rotor 100 were each alternated in magnet 101 by North and South Poles, it was found they interacted to create a higher flux density and intensity for greater electricity generation and power. The creation of high amounts of flux density created higher amounts of electricity. This higher flux density is considerably more intense and dense as the flux lines travel directly from North to South with the North and South Poles of both magnets 101 or magnet rotors 100, and the distance traveled, in the laboratory example was less than an inch apart, separated by coils 201 or coil plate 200.

In embodiments of the present invention and as demonstrated in laboratory, and as shown in FIG. 8, magnets rotors 100 and coils plates 200 may be encased by magnetic metal-laminated materials or magnetic steel or iron or magnetic metal or non-magnetic metal like stainless steel like a sealed case or a box that is completely closed, thus trapping the flux lines of magnets 101 within a centrifuge. This causes the flux density and intensity to be stronger against coils 201 as the magnetic metal-laminated materials or steel or iron or metal is magnetized by both coils 201 and magnets 101 making the magnetic field even stronger in the centrifuge. Since this flux density and intensity are stronger, more a higher potential difference, or voltage, may be are created, and thus more electrical current and wattage may also be created. This is also significant for the Electromagnet Field Realm and Torque Power Conversion discussed in the Mechanics Apparatus Power section below. As explained above, stronger flux lines density and intensity against coils 201 lessens the need for more energy (e.g. HP or FT PD) from mechanics apparatus or motor 300 and or gears and gear ratios 303 in order to still generate large amounts of voltage, current, and wattage. The Centrifuge's flux density and intensity creates a large amount of torque, lessening or eliminating any requirement of more energy (e.g., HP or more FT PD) that traditionally limits the generation of large amounts of inexpensive electricity for public use by other conventional applications. This stability and consistency of electric power generation in this Centrifuge Propulsion of flux density and intensity also additionally or independently eliminates the need for voltage regulators or electrical transformers and gears except for in particular embodiments of the present invention.

In the present invention and as demonstrated in our laboratory, in the embodiments shown in FIGS. 1, 2, 6, 5, 4, 8 as well as in FIG. 9, even without encasing, magnet rotor(s) 100 and coil plate(s) 200 or magnet rotor 100 and coil plate 200 in a Centrifuge, or single magnet rotor 100 and coil plate 200 as shown in FIG. 9, may be driven by motor 300. Motor 300 may be initially plugged into an electrical outlet or to a battery or to a transformer attached to the electric power source or to a rectifier capacitor or capacitors attached to the electric power source. Motor 300 may be employed for motion to turn magnet rotor 100 and coil plate 200 to generate electrical voltage, whether the outlet or battery is set to 110 Volts or 220 Volts. Embodiments of the present invention shown in FIG. 1 and FIG. 7 may generate more than 220 Volts and generates over one thousand (1000)

Volts. Some embodiments, such as those shown in in FIGS. 5 and 6, of the present invention can generate thousands or hundreds of thousands of Volts from a 110 Volts or 220 Volts outlet or a single battery. Accordingly, embodiments of the present invention can produce more voltage than an input voltage In the above described illustrative examples and embodiments of the present invention, less Volts (e.g., 110V or 220V) are being used to generate more Volts. This invention also may sustain itself for a long term, creating, for example, 110 Volts or 220 volts at 60 Hertz, or whatever is required to power Motor 300 by the Centrifuge. Thus embodiments can create the same amounts of Volts as though plugged into outlets of 110 Volts or 220 Volts or to a battery or to a transformer attached to an electric power source or to a rectifier capacitor or capacitors attached to the electric power source for motion or RPM in coil(s) 201 or magnet(s) 101. Simultaneously, embodiments may also provide electrical power to power residential and commercial appliances, motors, bulbs of 45 KVA and more.

In some embodiment of the present invention there can be 2 coil plates 200 to each one magnet rotor 100. In still other embodiments, where series of alternative energy generators are present, such as FIG. 5, there can be 8 coil plates 200 4 magnet rotors 100, wherein magnet rotors 100 is sandwiched by each of the 2 coil plates 200. In many other variations, there may also be numerous coil plates 200 sandwiching or sandwiched by numerous magnet rotors 100 and coils 201 are being rotated while magnets 101 are stationary and all coil plates 200 can be on the same shaft 400 or numerous shafts like shaft 400. Further, if magnets 101 are being rotated while coils 201 are stationary then all magnets can be on the same Shaft 400. There can also be many rows of coils plates 200 being rotated on one or many different shafts while magnets are stationary and there can also be many magnets rotors 100 on many shafts being rotated while the coils 201 are stationary. Therefore, there are no limitations of combinations of magnet rotor 100 and coil plate 200 as may be desired to generate hundreds or thousands or millions of Volts, Amperes, or Watts for private or public uses or residential or commercial uses, or to power motors or motor vehicles, also to power large motors or to create massive amounts of Volts or Amps for use in ships or aerospace. Based on the foregoing, in embodiments of the present invention, there is no limit to the amount of electricity that can be created to power numerous homes or a community or a town or city. A large frame 500 or many frames 500 in this present invention that can be built at any size or the size (e.g., a football field as needed or larger) with numerous magnet rotors 100 and numerous coil plates 200 as explained in the foregoing to generate and provide electricity.

All embodiments of the present invention provide a method and apparatus for generating electricity by a coil 201 of any size, or shape, or other electrical materials, etc., in motion or any magnet 101 of any size, shape, material, etc. in motion by motor 300, to create massive amounts of Volts under the Electromagnet Field Realm as explained above. It is known in the art that voltages of 110 or 220 at between 50 and 60 Hertz frequency are used regionally and globally. Revolution or rotation per minute from 5 RPMs to 10,000 RPMs or more will support household appliances as well as commercial appliances and motors Hertz frequencies in embodiments of the present invention, depending on the RPM, coils, and magnets configurations and sizes and the use of transformers if necessary to lower high voltage for residential and commercial uses as well as for other uses.

Embodiments will create 110 or 220 volts at between 50 Hertz (non-United States standard) and 60 Hertz (United Sates standard), from 5 RPMs to 10,000 RPMs driven by mechanics apparatus or motor 300 and gears ratios 303 described stated herein to support household or commercial appliances as well as motors' at particular rated speeds or rotation and torque, based on coils 201 and magnets 101 configurations and sizes. Additionally, as previously stated in the Electromagnet Field Realm section above, there is no limit to the electrical current, voltage, and wattage that can be created by embodiments of the present invention as embodiments can be easily upgraded or redesigned to add more centrifuges or magnets 101 and/or more powerful magnets 101 as well as more and or bigger coils 201 of any gauge wire. Furthermore, Frame 500 can be made to be any size (e.g., 10×10×10 to the size of a football field) to accommodate hundreds of thousands of coils 201 or coil plates 200 and magnets 101 or magnet rotors 100. In one embodiment, frame 500 is 2 feet wide and 4 feet long and rectangular in shape.

Mechanics Apparatus Power:

As stated above, embodiments of the present invention provide a method and apparatus for generating electricity by a coil 201 of any size, or shape, or other electrical materials, etc., in motion or any magnet 101 of any size, shape, material, etc. in motion by a mechanics apparatus. Using mechanics apparatus or motor 300 to increase RPMs can generate torque power; however, decreasing RPMs can also generate even more torque power, depending on the needs or requirements of a particular embodiment. The power of mechanics apparatus may be measured in Horse Power (HP) or Foot Pounds (FP) combined with RPMs from five (5) to over one hundred thousand (100,000) RPMs or more. In creating massive amounts of Volts, Amperes, and Watts, a hand-propelled device or a motor of any size is sufficient, but even more Volts, Amperes, and Watts are created when a set of gear ratios are applied to scale up an applied torque.

In one illustrative embodiment, mechanics apparatus or motor 300 is set at 1750 RPM and is used to generate from 5 RPM to 10,000 RPMs by using a 2:1 gear ratios 303 or set of gear ratios and idler gears 303. In this illustrative example, motor 300, set at a low RPM can now be used to generate over 10,000 RPMs using a 2:1 gear ratios 303. Furthermore, in this illustrative embodiment, using three small 14 gauge wire coils 201 and the gear ratio, it is possible to create over one thousand (1000) Volts. Furthermore, motor 300 can be used to also generate electrical current at 350-900 RPMs at 50 or 60 Hertz, with one or more coil(s) 201 and also using 8 coils 201 or 16 coils 201, respectively, with gear ratios with idler gears at a 2:1 ratio. As stated before, sequential centrifuge units, such as in FIG. 6 can be used to generate electricity depending on needs or requirements, continuously (24×7). By applying set of gear ratios and idler gears 303 to sequential centrifuge units, such as in FIG. 6, the electricity producing power of such sequential units is greatly scaled.

It is known in the art that electrical current or wattage is required to power or run or support load in an electrical circuit such as light bulbs, electrical appliances of all sorts (e.g., for motors or for households) and commercial appliances and other public devices. Embodiments of the present invention may create a 110 volts single phase or 220 volts two phases to support household or commercial or public appliances and motors, and can create from 1 Amp to 200 Amps to thousands of Amps, converting to millions of Watts or hundreds of thousands of KVA. Further, embodiments may be configured to continuously create electrical current and voltage. Additionally, embodiments are easily upgraded or easily redesigned to add more centrifuges of varying sizes with more magnets 101 of any size and coils 201 of any gauge wires to create hundreds or thousands of Volts, hundreds or thousands of Ampere and thus hundreds of thousands of Watts, by increasing the generation of Volts, Amps, and Watts based on the particular needs and requirements of a residential, commercial or industrial setting.

In embodiments of the present invention more than one magnet rotors 100 and more than one coil plates 200 may be added to an electricity generating centrifuge apparatus of invention in order to add more magnet rotors 100 and more coil plates 200 (called Centrifuges) to generate more electrical current, voltage, and wattage.

In FIG. 7 magnet rotor 100 and coil plates 200 are so arranged such that 2 coil plates 200 are on either sides of one magnet rotor 100. Likewise, numerous such sandwiching arrangements of coil plates 200 or coils 201 by magnet rotors or numerous such sandwiching arrangements of coil plates and magnet rotors in rows such that there may be dozens of magnet rotors 100 and coil plates 200 arranged on one or more shafts 400 to generate a desired number of Volts, Amps, and Watts.

The Electromagnet Field Realm and Torque Power Conversion

As discussed above, embodiments of the present invention provide a method and apparatus for generating electricity by a coil 201 of any size, or shape, or other electrical materials, etc., in motion while magnets 101 are stationary or any magnet 101 of any size, shape, material, etc. in motion while coils 201 are stationary, rotated by Mechanical Apparatus or by Motor 300 to overcome the Electromagnet Torque of magnet(s) 101 or coil(s) 201 during any electrical current generation and work-load. As used herein, work-load shall mean when household appliances or other commercial appliances or motors or machines are using the electricity generated by an apparatus of the present invention.

It has been shown in laboratory that a strong Electromagnet Torque exists between magnet(s) 101 and coil(s) 201 when current or wattage are being used from them or while generating electricity to do work or for current or wattage workload. In embodiments and as discovered in laboratory, the Electromagnet Torque between magnet(s) 101 and coil(s) 201 is proportional to the product of their electric charge and attraction and repulsion forces and inversely proportional to the square of the distance between the apparatus devices (e.g., magnet rotor 100 and coil plate 200). The closer the proximity of magnet rotor 100 and coil plate 200, the stronger the Electromagnet Torque or power. This means that the Electromagnet Torque of the magnetic Field Realm and Electric Field Realm of magnets 101 and coils 201 or magnet rotor 100 and coil plate 200 when Watts or Amps are being used in a workload or to do work, for example to light a light-bulb, a strong attraction and repulsive torque force is generated. Accordingly, as in embodiments, a strong mechanical force from mechanics apparatus (e.g., applied by motor 300) with certain gear ratios (e.g., gear ratios 303) may be used for higher RPM or torque to generate even more electrical current to do work or to power homes or businesses or for residential and commercial uses.

Mechanics apparatus 300 and gear ratios 303 with idler gears 303 may be used to drive higher FT PD or HP. As used in embodiments of the present invention, HP use for Motor 300 may be a minimum of 0.5 HP to 50 HP or one FT PD to 330,000 FT PDs to 1650000 FT PDs to self-generate electric voltage, current, and wattage (hereinafter "Minimum HP or FT PD"). The larger the mechanics apparatus HP or FT PD the more torque force to generate more electric voltage, current, and wattage. The more currant or wattage that are used, the more Electromagnet Torque required to stabilize Volts and RPMs. Hundreds or thousands of HP can be used in embodiments with a desired mechanics apparatus or Motors 300 with gear ratios 303 with idler gears to power even ships or aerospace crafts. In general, higher HP or FT PDs than specified above may be generated by increasing HP and FT PDs via mechanics apparatus or motor 300 and increasing a number of gear ratios and idler gears reducers 303.

In laboratory, it was discovered that motor 300 and gears 303 may be used to generate and sustain electric voltage, current, and wattage adequate to power motors, appliances, residential and commercial buildings. Motor 300 HP or FT PD can be amplified by gears ratios 303 with idler gears 303 or idler gears reducers 303 to create more or desired power or energy. This may be used to generate or self-generate a desired amounts of sustainable electric voltage, current, and wattage to charge batteries or for direct (without the use of battery or batteries or outlets) residential and commercial use or to power residential or commercial appliances or motors directly without the use of a battery or batteries or outlets or to power a commercial enterprise directly without the use of a battery or batteries or outlet, as well as to overcome the Electromagnet Torque of the magnetic Field Realm and Electric Field Realm existing between coils 201 and magnets 201 when electric voltage, current, and wattage are being used to light a light bulb or to power such residential or commercial appliances and motors. Because of the power or current or workload being used, the magnetic and Electric Field Realms become a very powerful force field with a very strong Electromagnet Torque force therefore HP or FT PDs are required to overcome these force fields to generate or self-generate electricity to power a load or device.

The Electromagnet Torque of generating and using a wattage work-load or voltage or currant is obtained through mechanics apparatus (e.g., mechanical crank device 300A used manually) or motor 300 with gears ratios 303 driving FT PDs or HP. In one example 2:17 Gear Ratios 303 using a minimum two Gears 303 may be used to increase or decrease revolutions or rotations per minute (RPMs) for speed. Conversely, if stronger Torque is desired gear ratios with idler gears reducers 303 may be added. Idler gears reducers 303 are also used to increase or decrease RPM as well as to increase or to decrease torque power, for example, to light a light bulb or to power residential or commercial homes and their appliances and motors such as a vacuum cleaners each up to 14 Amps and by adding power saws, each using 12 Amps and 9 Amps, respectively, with also adding 300 Watts bulbs burning 17 Amps at 110 Volts single phase. Embodiments may power residential and commercial buildings using single phase to three phases as desired. Desired RPMs are based on coil 201 windings and wire gauge and the turns of the coil(s) 201 and the number and power or surface gausses of magnet(s) 101 used with coil(s) 201 or magnet rotor 100 and coil plate 200.

In an example, a 2:17 gear ratios can create Electromagnet Torque to create voltage, currant, and wattage from one Amp to more than a hundred Amps and with gear ratios with idler gears reducers can create hundreds or thousands of Volts, Amps, and Watts by increasing HP or FT PD for Torque.

Wire gauge and turns of coil(s) 201 and the number and or sizes of magnet(s) 101 and coil(s) 201 may be configured according to need. Sizes shall mean for coil(s) 201 the gauge of wires selected and for magnet(s) 101 the power or surface Gausses of magnet(s) 101. In general, a lower gauge wires has a lower resistance and thus give more current. Likewise, more powerful magnets based on surface gausses provide greater power for the coil(s) 201 to give more current. Also, coils 201 with more windings give more voltage and current. Higher Gauge wires (e.g., 14 gauge and above) can more than quadruple the number of Volts produced in embodiments of the present invention.

With higher volts above 120/240 a step-down transformer and breakers may be used to match the required voltages for Amps and Watts required by homes, buildings, motors, appliances, devices, or other applications as needed. To achieve the rotation and Torque power to generate wattage and current, gear ratios 303 may be made to be any of 2:1, or 2:2; or 3:3; or 4:4 or 4.1 with the addition of idler gears 303 and/or idler gears reducers 303 as torque and or speed is desired or required, and this arrangement of gear ratios 303 can be limitless. The more gear ratios 303 with drive and driven gears 303 with Idler Gears 303 between drive and driven gears 303 for speed or conversely gears reducers 303 for higher torque, the more speed or torque to generate more current, voltage, and wattage for workload. Further, there is no limit to the number of gear ratios 303 and idler gears 303 that may be used. In an illustrative embodiment, for example, in order to generate 800 Amps, a 2:2 gear ratio 303 is used with maximum 150 HP; to generate 1600 Amps a 4:4 gear ratio 303 is used with maximum 200 HP. The more HP and gears in ratio(s) 303 that are added with idler gears 303, the stronger the gears 303 for speed and/or more Torque to generate unlimited Volts, unlimited Current or unlimited Wattage. Also, the more HP or FT PD added through the gear ratio(s) 303 the more torque increases to generate unlimited Volts, Current or Amps or Wattage.

In another embodiment of the present invention 16 coils 201 and 16 magnets 101 may be used in coil plate 200 or magnet rotor 100, respectively, at 900 RPM that achieves 50 or 60 Hertz frequency to generate 120/220/240 Volts to over 2000 Volts, 100 Amps or thousands of Watts to power, e.g., a residence, using 10 gauge wire, each coil 201 at less than 0.3 Ohms resistance. When each coil 201 is made to be 0.02 Ohms resistance, with all coils 201 equaling 0.0026 Ohms resistance, Amps in the thousands are available for use when motor 300 and gear ratios 303 provide Centrifuge with Torque Propulsion. Coils can be of lower or higher resistances; the difference is the higher the resistance, the lower the current, and the lower the resistance the higher the current. Coils used in embodiments of this invention have a resistance as low as 0.001 Ohms, yielding high voltage and much higher amperage.

Embodiments of the present invention provide a method and apparatus for generating electricity by a coil 201 in motion or a magnet 101 in motion that overcomes Electromagnet Torque. In general, a minimum of 5 RPM is required to generate current. In the art, it is generally it is known that 3400 to 3600 RPM at 50 or 60 Hertz frequency is the magnetic conversion but coil numbers and their windings can make for much lower or much higher RPM to generate voltage, currant, or wattage, but the much higher RPM would be for much higher volts at the 50 or 60 Hertz Frequency. Note that higher RPM will create more Torque power to create current, but likewise lower RPM will create even more Torque power and thus more current as shown in embodiments of this invention when either magnet rotor 100 or coil plate 200 is rotated while the other remain stationary as specified above. Higher RPM over 600 or 900 and up to 4000 RPM will create higher voltage which may have to be step down by a transformer or volts regulator for residential and commercial uses at the required frequencies or Hertz, depending on an intended usage. RPM higher than 4000 and up to 100,000 RPM will generate voltage for non-commercial, non-residential uses where higher Frequencies or Hertz are not obstacles to using the electric current from the Centrifuges.

All Embodiments of the present invention provide a method and apparatus for self-generating electricity by a coil 201 of any size, or shape, or other electrical materials, etc., in motion or any magnet 101 of any size, shape, material, etc. in motion, that overcomes Electromagnet Torque to create voltage, current, and wattage. If a motor 300 or mechanics apparatus is used as part of an embodiment's initial power source, gears ratios 303 and magnet rotor 100 may be powered by motor 300 with a battery 800 and inverter 700 (in the case of a DC battery) unless an AC battery is used or an outlet with 2 to 10 Amps power requirement for the initial start-up time of a few seconds for embodiments of the invention to begin generating or self-generating 2 to 30 Amps and to power Motor 300, such that the electricity generating centrifuge apparatus of embodiment becomes its own self-creating or self-generating electricity source to power itself without the use of battery or wall socket for current. Note that when motor 300 is being powered by the self-generation of electricity by the electricity generating centrifuge apparatus of embodiments, the amperage used by motor 300 are the same or below the amperage that motor 300 is rated at and the embodiment generates sufficient current to power motor 300 as well as powering a receiving device, such as a residence or commercial enterprise.

Scenario One:

In this invention and as discovered in laboratory, numerous gear ratios tests to generate voltage, current, and wattage have been successfully completed wherein a motor 300 rated at 1750 RPMs along with gears ratios 303 with idler gears 303 maximized the generation of FT PDs. FT PD or Torque is the degree of magnitude of a force multiplied or increased by the distance the force travels from the center of the rotation or center of gravity. (Force×Distance=Torque). Torque can be measured in units of Force times Distance as Inch-Pounds of Newton-Meters or FT PD per Minute or FT PD per Second. Finally, Torque is the Force acting on another Force or Mass. In embodiments of this invention, initial motor 300 used converted to FT PD at 165,000 FT PD per minute with gear ratios 303 with idler gears 303 had a 1.9 gears ratio. The motor's 1750 RPM times the 1.9 gear ratio yields 3,325 RPM. This RPM more than double voltage, current, and wattage. There is also a significant increase in FT PD from the initial HP or FT PD. 8, then 16 ten-gauge wire coils 201 in coil plate 200 wind each at 0.06 Ohms for a total resistance of 0.96 Ohms. Each, each coil 201 gave 25 Volts for a total voltage of 400 Volts yielding 416 Amps, at 50 or 60 Hertz Frequency.

This invention may also increase FT PD and or Torque by stepping down RPM from 3,325 RPM to 900 RPM such that gears ratios converting 3,325 RPM to 900 RPM used the same assemblage of magnets 100 and coils 200, with the same gauge wire and resistance configuration. The actual amperage used in testing was 30 Amps. More amperage was immediately available for use but usage was not attempted during tests. In this Scenario One it is shown that embodiments of the invention create voltage and amperage at 3325 RPM using a higher speed or velocity as well as at 900 RPM using a lower speed or velocity. At 3325 RPM a minimum one or two coils 201 could be used at 50 or 60 Hertz Frequency as well.

Scenario Two:

In embodiments, another gear ratios test was performed with a different gear ratios 303 with idler gears 303 configuration where gear ratios 303 with idler gears 303 had a 0.625 gear ratio. In this configuration, each coil 201 in coil plate 200 is 0.021 Ohms at coil wire gauge 10 at eight coils 201, at a total of 0.0026 Ohms across all coils at 125 Volts. (Higher RPM velocity up to 3900 RPMs was tested and always yields significantly higher Volts and Amps). This configuration also contains magnets 101 and magnet rotor 100 at 900 RPM with motor 300 with gear ratios with idler gears reducers at gear ratios 0.6 at 900 RPM with FT PDs at 825,000 generating 125 Volts, yielding 20 Amps at minimum 160 Amps for eight (8) coils 201 in coil plate 200 with magnets 101 with magnet rotor 100 at minimum 20,000 current.

Embodiments of the present invention provide a method and apparatus for generating electricity by a coil 201 of any size, or shape, or other electrical materials, etc., in motion or any magnet 101 of any size, shape, material, etc. in motion, wherein overcome Electromagnet Torque to self-generate electricity using a minimum of less than 137,000 FT PD. In this embodiment of the invention, motor 300 provides 33,000 Foot Pounds or half of a HP is used to generate 500 Volts using gear ratios with idler gears ratios 303 at gear ratio 2.17.

Embodiments provide a method and apparatus for generating electricity by a coil 201 of any size, or shape, or other electrical materials, etc., in motion or any magnet 101 of any size, shape, material, etc. in motion, wherein any motor 300 used with gears ratios 303 with idler gears 303 self-generate or generate more HP or FT PDs using gears ratios 303 than the HP or FT PD for which any of the motor 300 is rated for or any mechanical device used for the initial mechanical power source for RPM or velocity started out with. In one embodiment of the present invention, motor 300 of 3 HP (approximately 99,000 FT PD) is made to generate 750,000 FT PD using gear ratios 2.1 303. Thus less than 99,000 FT PDs has been used to generate or self-generate 750,000 FT PD, the equivalent of 25 HP, thereby also achieving the self-generation of greater amounts of electricity using the starting out 3 HP to end with equivalent 24 HP or starting out with 99,000 FT PDs and achieving 750,000 FT PDs. In accordance with the foregoing, if one HP is required to generate or self-generate 6.2 Amps, then twenty (24) HP generates 148 to 186 Amps using a 2.1 gear ratio 303 with idler gears reducers 303. Furthermore, in embodiments with motor 300 of three (3) RPM, generating 800 Amps at 2.2 Gear Ratio 303 can be used; and generating 1600 Amps with a 4.4 Gear Ratio 303 is used. The more gears in ratio 303 that are added with idler gears reducers 303, the stronger the gears 303 for speed and or torque to generate unlimited voltage, unlimited current or unlimited wattage. Also, the more HP or FT PD added using the configuration through the gear ratio(s) 303, the more Torque embodiments of the present invention create to generate unlimited voltage, current, or wattage.

In other embodiments, a Motor 300 may be used. Motor 300 may be attached to a battery 800 and inverter 700 or plugged into an outlet providing a micro-second to a second of both startup time and running time to get magnet rotor 100 from, for example, five (5) RPM to nine hundred (900) RPM through the gear ratio 303. In an example, an electricity generating centrifuge apparatus may be configured with sixteen coils 201 in coil plate 200 and sixteen magnets 101 in magnet rotor 100, and generate 320 volts from a 10 gauge copper wire coils at 0.7 Ohms, yielding 320 Volts at potentially 333 or more Amps. Motor 300 may use about nine (9) Amps, including startup Amps for Motor 300 from battery 800 or outlet. In some embodiments, there may also be a startup transfer cut-off switch to transfer about 9 Amps of current to motor 300 while simultaneously cutting off current from battery 800 and inverter 700 or an outlet to motor 300 such the electricity generating centrifuge apparatus of embodiment of the present invention now powers motor 300 itself for self-generation of its own electricity.

In other embodiments of the present invention, a motor 300 is attached to battery 800 or plugged into an outlet providing a micro-second to short startup time and running time to get Rotor magnet rotor 100, for example, of eight (8) or sixteen (16) magnets to a requisite RPM through the gear ratio 303 with, for example, eight (8) or sixteen (16) coils 201 in coil plate 200. 320 volts can be generated from a 10 gauge copper wire coils at 0.7 Ohms total, yielding 320 Volts at potentially 333 plus Amps. Motor 300 uses about 2 to 15 Amps including startup Amps for Motor 300 to operate at rated Amp, speed and torque, from battery 80 and inverter 700 or outlet. There is a Startup Transfer Cut-Off switch to transfer 2 to 15 synchronized (a transformer additional synchronized electricity compatibility via Battery/inverter or wall socket) Amps of current to motor 300 from the self-generation of its own electricity source while simultaneously cutting off Amp current from battery to motor 300, thus the electricity generating centrifuge apparatus of embodiments of the present invention powers itself while providing additional and adequate voltage, current, and wattage to power residential and or commercial buildings with their appliances, motors or machinery.

Battery/Inverter

In one embodiment, volts, amperage and watts are provided via or as a pass-through electric current to motor 300 by a single AC or 48 VDC battery 800 or a by a AC or VDC battery bank through to motor 300. In one aspect of the present invention, via a 48 VDC battery 800 and inverter 700, 23 amps are provided to motor 300 or motors that require higher voltages and amperages that power magnet rotor 100 that generates 120/240 Volts at 100 Amps and or more to charge battery 800 or as a pass-through of electric current to battery 800 to motor 300 to power motor 300 with additional Amps/Wattage with immediately available amperages to power another device.

In another embodiment volts, amperage and watts are provided via or as a pass-through electric current to motor 300 by a 48 VDC battery 800 and inverter 700 passing through 23 Amps to power motor 300 or more than 23 Amps for larger motors, as required and rated, to power magnet rotor 100 to generate over 700 Volts stepped down, for example, for residential and commercial uses by a transformer to 120/240 Volts at over 100 Amps or to self-charge battery 800. Embodiments can generate volts and amperages in the tens, hundreds, thousands or million of Amps as needed, and may operate 24 hours per day at 7 days per week, while passing through electric current to power motor 300 with additional Amps/Wattage immediately available to power, for example, a residential, commercial or other kinds of properties with all its appliances including motors and heaters and other applications that uses electric current from the residential or commercial property or other kinds of buildings for residential, commercial or industrial uses. In this aspect of the present invention, hundreds of Amps or hundreds of KVAs are generated with the use of a transformer, where applicable, to step down voltages or step up voltages depending on volts, amps, watts requirements, to power commercial and industrial enterprise at 2 Phases and 3 Phases respectively. In this aspect of the present invention the use of additional centrifuges and or higher gauge wires from 10 gauge to 20 gauges result in thousands of volts stepped down by a transformer that converts to hundreds of Amps or hundreds of KVAs, if and as required but likewise other gauges wires can be used from ten gauge to one gauges for the generation of electricity for residential, commercial, industrial and motorized uses of any kind.

In either of the above embodiments, battery 800 and inverter 700 provide volts, amperage and watts current via or as a pass-through electric current to Motor 300 by a single AC or 48 VDC battery or a by a AC or VDC battery bank through to motor 300. Embodiments also provide a battery-charger as an internal or external component of a system or otherwise to recharge battery 800, batteries or battery bank that powers the Motor 300. In one aspect of the present invention, via 48 VDC battery 800 and inverter 700, 23 Amps are provided to motor 300 or motors requiring higher voltages and amperages that powers magnet rotor 100 that generates 120/240 Volts at 100 Amps and or more to charge battery 800 or as a pass-through of electric current to battery 800 to Motor 300 in order to power Motor 300 with additional Amps/Wattage with immediately available amperages to power an additional load, such as a residence.

The battery-charger as an internal or external component of embodiments of the present invention provides required or rated requirements of volts, amps, watts for recharging a battery, batteries or battery bank as needed and as has been demonstrated in laboratory. The charger may be used to otherwise recharge the battery, batteries or battery bank that powers the motor 300 at required or rated requirements of volts, amps, watts current. Any motor 300 of any size can be used by embodiments of the present invention to rotate magnet(s) 101 or magnet rotor(s) 100 or to rotate coil(s) 201 or coil plate 200 depending on whether coils or coil plates or being rotate or magnets or magnet rotors are being rotated noting that only coil(s) can be rotated while magnet(s) remaining stationary or only magnet(s) can be rotated while coil(s) remaining stationary and that neither coil(s) nor magnet(s) can be simultaneously rotated to generate electricity following Faraday's Law of electric and magnetic conversion to generate electricity.

In yet another embodiment of the present invention, volts, amps, and watts are provided to power residential, commercial, industrial properties or buildings directly from two (2) sources: (1) the centrifuge(s) of embodiments of the present invention (i.e., magnet rotor 100 and coil plate 200 assemblies) that provide a requisite or rated level of volts, amps, watts and (2) directly from inverter(s) 700 that provides volts, amps or watts from battery 800 or batteries being simultaneously under loads while being recharged by an inverting system according to embodiments of the present invention.

Capacitor(s)-Rectifier Drive

A Capacitors-Rectifier Drive 900 (defined herein as a controller instrument that stores or holds electricity for at least 0.2 second for immediate re-use) may be used in embodiments of the present invention as a pass-through device for voltage (other than a battery 800 or battery bank). Battery 800 or batteries are not necessary in embodiments having Capacitors-Rectifier 900, but battery 800 may be in place as a precaution in case Capacitor(s) 900 fail to activate. A Capacitors-Rectifier Drive 900 may be used in embodiments as a pass-through device for voltage to motor 300 that also allows for cleaner and more stable voltage for 0.2 seconds and also serves the purpose of transferring current (e.g., from a wall socket or a battery or batteries 800) to motor 300 that powers or rotates magnet rotor 300 to generate electricity and upon generation of volts, amps and watts by embodiments, volts, amps, watts moves through capacitor(s) to motor 300 to power motor 300 that rotates magnet(s) 101 or magnet rotor 100.

In another embodiment motor 300, capacitor(s) or capacitor drives 900 (e.g., a device with connecting capacitor(s) and rectifiers) acts as a One-Phase, Two-Phase or Three-Phase transfer of electricity to motor 300 and also stands between electricity generated in electricity generating apparatus to power the apparatus where an electricity Transfer-Switch is attached to both battery or batteries 800 or a wall socket linked or to utility company electricity and generated power by the apparatus itself. Once electricity is generated by the apparatus, the Transfer-Switch is operated to stop current from the battery or batteries 800 or wall socket or utility company and at the same time switch power via the capacitor(s) 900 to power motor 300 from the apparatus' generated electricity power that is turned on, or switch to switch generated electricity to motor 300 very quickly (e.g., in millisecond(s)). Accordingly, embodiments of the present invention power itself in a similar way of battery 800 and inverter 700 embodiment.

Embodiments of the present invention provide a method and apparatus for self-generating electricity by a coil 201 of any size, or shape, or other electrical materials, etc., in motion or any magnet 201 of any size, shape, material, etc. in motion, that creates Volts, Current or Amps, or Watts. In other embodiments of the present invention, one coil 201 or a thousand coils 201 with matching or unmatching numbers of magnets 101 or larger coils 201 and larger magnets 101 with more powerful surface gausses can be used to generate or self-generate hundreds or thousands of Volts, hundreds or thousands of Amps or Current or hundreds or thousands of Watts. Therefore, embodiments of the present invention can be converted to be used to power any varying device, including, and not limited to a motor vehicle instead of the use of fossil fuels (gasoline, oils, gases, chemicals etc.), and thus can be used to power motor vehicles like cars, trucks, buses, as wells as boats, ships and also to power aerospace machines or motors or flights.

Embodiments of the present invention provide a method and apparatus for generating electricity by a coil 201 of any size, or shape, or other electrical materials, etc., in motion or any magnet 101 of any size, shape, material, etc. in motion, that overcomes Electromagnet Torque to self-generate electricity using motor 300, gears ratios 303 to self-generate or generate more HP or FT PD using gears ratios 303 than the HP or FT PD used to run motor 300 or for which motor 300 is rated for or any other mechanical device used for the initial energy or RPM or velocity started out with. In one illustrative embodiment, about 80 Amps and 50 Volts at about 6 HPs are needed to power the transmission and gear boxes of a motor vehicle in order for a motor vehicle to be powered or driven on electricity alone without the aid of a battery or batteries or fossil fuels or chemicals. In an embodiments of the present invention, an electricity generating centrifuge apparatus can be configured to power a car directly (i.e., without the aid of a battery or batteries or fossil fuels or chemicals) based on the Amps generated. Further, a motor vehicle may be sped up this change or configuration of coils 201 and magnets 101 or magnet rotor 100 and coil plate 200 of magnets or coils, thus increasing electricity power to the transmission and gear boxes of the motor vehicles self-powered by embodiments of this invention. In all embodiments, an electricity generating centrifuge apparatus can also be configured to power large motor vehicles such as trucks and buses by increasing the coils 201 and magnets 101 configuration and RPM of magnet rotor 100. All motor vehicles will run or can run or be driven by embodiments of the present invention non-stop for days, weeks, or years without stopping.

In embodiments, all motor vehicles using battery or batteries as their electric power can be configured with an electricity generating centrifuge apparatus. About 15 Amps are required to charge a battery or batteries to power a motor vehicle as well as to charge or recharge one or more batteries used for residential and commercial motors. In embodiments, since the battery or batteries can or will be charged continuously (i.e. twenty-four hours per day and seven days per week), motor vehicles can run or can be powered or driven by an electricity generating centrifuge apparatus non-stop for days, weeks, or years without stopping to recharge the battery or batteries.

In embodiments, gear ratios 303 with idler gears 303 configuration may be present with gear ratios 303 with idler gears 303 at 0.625 gear ratios. Coils 201 may be configured such that each coil 201 in coil plate 200 has a resistance of 0.021 Ohms at coil wire gauge 10 with sixteen (16) coils 201. Each coil 201 yields 0.021 Ohms and totals 0.0026 Ohms at 125 Volts with each coils 201 equaling 125 Volts wherein coils 201 are arranged in parallel yielding 110 Volts with 320 Amps or sixteen (16) coils 201 yielding 20,000 Volts wherein arranged in series yielding many thousands of potential Amps for the sixteen (16) coils 201 with sixteen (16) magnets 101 in magnet rotor 100. (A 54 HP motor 300 at 1750 RPM may be used to power this embodiment). This embodiment of the invention uses 10,000 RPM for sixteen coils 201 in coil plate 200 and sixteen (16) magnets 101 and magnet rotor 100 at the previously stated gausses at 10,000 RPM with motor 300 with gear ratios with idler gears reducers at gear ratios 6.1 at 10,675 RPM generating 20,000 Volts at minimum 3,200 Amps for sixteen (16) coils 201 in coil plate 200 arranged in parallel or with magnets 101 with magnet rotor 100. In coils 201 for coil plate 200 arranged in parallel or in series the many thousands of Volts or the many thousands of even more Amps and watts can be stepped down by a transformer to allow for the use of household appliances or motors or electronics using 50 to 60 Hertz Frequency. Furthermore, coils 201 can be arranged in numerous phases to allow for Volts, Amps, or Watts to be used in lesser numbers by partitioning, for example with a Breaker Box in a home, creating numerous zones or breakers such that current is used to power independent and different sets of heavy duty motors or appliances or equipment. For example, energy generating centrifuge apparatus can be used to power 50 different, independent and residential homes by arranging a breaker for each home.

In embodiments, gear ratios 303 with idler gears 303 configuration may be present with gear ratios 303 with idler gears 303 at 0.625 gear ratios. Coils 201 may be configured such that each coil 201 in coil plate 200 has a resistance of 0.021 Ohms at coil wire gauge 10 with one hundred (100) coils 201. Each coil 201 yields 0.021 Ohms at 1,250 Volts for each coil 201 where coils 201 are arranged in Series yielding many thousands of potential Amps for one hundred (100) coils 201 at 3400 to 10,000 RPM. In this embodiment, an electricity generating centrifuge may be configured with one hundred (100) magnets 101 and magnet rotor 100 at the previously stated Gausses at 10,000 RPM with motor 300 with gear ratios with idler gears reducers at gear ratios 0.6 at 10,000 RPM generating 1,250 Volts 201 in coil plate 200 arranged in series or with one hundred (100) magnets 101 with magnet rotor 100. In coils 201 for coil plate 200 arranged in series for many thousands of Volts, the many thousands of even more Volts or Amps/Watts can be stepped down by a Transformer to allow for the use of electronics using 50 to 60 Hertz Frequency. Furthermore, coils 201 can be arranged in numerous phases to allow for voltage, amperage, and wattage used in lesser numbers. For example, embodiments of the present invention can be partitioned like a breaker box, creating numerous zones or breakers such that volts, amps, and watts are used to power independent and different things. For example, one embodiment can be used to power 50 different, independent and residential homes. In some further embodiments, to generate 1000 Amps, 162 HP would be required with gear ratios 303 and idler gears 300, and 324 HP would be required to generate 2008 Amps with gear ratios 303 and idler gears 300. 500 HP would be needed to generate 3100 Amps with gear ratios 303 and idler gears 300. Some embodiment of the invention may be used to power airplanes and large industrial plants.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. An electrical generator device, comprising:
   a rotating apparatus, the rotating apparatus comprising a first disk plate having an axis of rotation about a central axis of the first disk plate and a mass;
   at least one metal coil disposed on a face of the first disk plate;
   at least one stationary magnet disposed on a face of a stationary second disk plate, wherein a magnetic flux field of the magnet is in contact with the metal coil and a central axis of the stationary second disk plate is collinear to the central axis of the first disk plate;
   a shaft secured to the first disk plate along the axis of rotation of the first disk plate and passing through the second disk plate along the central axis of the second disk plate;
   a mechanical movement delivery apparatus in mechanical contact with the shaft; and
   a set of gears having a gear ratio of more than one in mechanical contact with the first disk plate and the mechanical movement delivery apparatus via the shaft, wherein energy is generated when the metal coil passes through the magnetic flux field of the magnet.

2. The electrical energy generator device of claim 1, wherein the rotating apparatus is rotated through the magnetic flux field.

3. The electrical energy generator device of claim 2, wherein the rotation is in response to a mechanical or electrical force being applied to the mechanical movement delivery apparatus.

4. The electrical energy generator device of claim 1, wherein the at least one stationary magnet is a rare earth magnet.

5. The electrical energy generator device of claim 1, further comprising:
   a stationary holding device on which the magnet is disposed, the stationary holding device having a central axis and the central axis being in line with the axis of rotation of the rotating apparatus.

6. The electrical energy generator device of claim 1, further comprising a receiving load.

7. The electrical energy generator device of claim 6, further comprising:
a positive wire attached along the shaft having a distal wire brush end in electrical contact with the coil and a proximate end in electrical contact with the load; and
a negative wire attached along the shaft having a distal wire brush end in electrical contact with the coil and a proximate end in electrical contact with the load.

8. The electrical energy generator device of claim 1, the mechanical movement delivery apparatus comprising a motor and at least one of: a crank, a battery, an electrical plug, and set of capacitors, configured to deliver an initial supply of power to the motor.

9. The electrical energy generator device of claim 8, wherein the motor rotates the shaft and the rotating apparatus at a velocity to generate sufficient momentum for essentially continuous rotation and wherein some of the generated energy is received by the motor.

10. The electrical energy generator device of claim 1, wherein the least one metal coil is a plurality of metal coils, wherein a voltage is generated when the plurality of metal coils passes through the magnetic flux field of the magnet and the voltage generated is proportional to a quantity of metal coils.

11. An electricity generator, comprising:
a rotating apparatus, the rotating apparatus comprising a first disk plate having an axis of rotation about a central axis of the first disk plate;
at least one magnet disposed on a face of the first disk plate;
at least one stationary metal coil disposed on a face of a stationary second disk plate, wherein a magnetic flux field of the magnet is in contact with the metal coil and a central axis of the stationary second disk plate is collinear to the central axis of the first disk plate;
a shaft secured to the first disk plate along the axis of rotation of the first disk plate and passing through the second disk plate along the central axis of the second disk plate;
a mechanical movement delivery apparatus in mechanical contact with the shaft; and
a set of gears having a gear ratio of more than one in mechanical contact with the first disk plate and the mechanical movement delivery apparatus via the shaft, wherein energy is generated when the magnetic flux field of the magnet passes through the metal coil.

12. The electricity generator of claim 11, wherein the magnet comprises one of: a rare earth magnet, a neodymium magnet and a samarium-cobalt magnet.

13. The electricity generator of claim 11, wherein the rotating apparatus is rotated in response to a mechanical or electrical force being applied to the mechanical movement delivery apparatus.

14. The electricity generator of claim 11, further comprising:
a stationary holding device on which the coil is disposed, the stationary holding device having a central axis and the central axis being in line with the axis of rotation of the rotating apparatus.

15. The electricity generator of claim 11, further comprising:
a receiving load;
a positive wire having an end in electrical contact with the coil and a proximate end in electrical contact with the load; and
a negative wire having an end in electrical contact with the coil and a proximate end in electrical contact with the load.

16. The electricity generator of claim 11, the mechanical movement delivery apparatus comprising a motor and at least one of: a crank, a battery, an electrical plug, and set of capacitors, configured to deliver an initial supply of power to the motor.

17. The electricity generator of claim 16, wherein the motor rotates the shaft and the rotating apparatus at a velocity to generate sufficient momentum for essentially continuous rotation and wherein some of the generated energy is received by the motor.

18. The electricity generator of claim 11, wherein the magnet is a plurality of magnets, wherein a voltage is generated when magnetic flux fields of the plurality of magnets passes through the metal coil and an output voltage is amplified from an input voltage.

19. A method of operating an electrical generator, comprising:
powering a motor, in mechanical contact with a rotatable apparatus comprising a first disk plate embedded with one of metal coils or magnets, with an outside source;
rotating the rotatable apparatus at at least 5 revolutions per minute (RPM);
passing a metal coil through a magnetic field via the rotating motion of the rotatable apparatus, wherein, in the case that the first disk plate is embedded with metal coils, the first disk plate is rotated about a central axis of a stationary second disk plate embedded with a set of magnets, and wherein, in the case that the first disk plate is embedded with magnets, the first disk plate is rotated about a central axis of a stationary second disk plate embedded with a set of metal coils;
generating an electrical current based on the passing of the metal coil through the magnetic field;
disconnecting the outside source;
powering the motor with the generated electrical current.

20. The method of operating an electrical generator of claim 19, wherein at least one receiving device is powered by the generated electrical current.

* * * * *